US012441015B2

(12) United States Patent
Zjiroecha et al.

(10) Patent No.: US 12,441,015 B2
(45) Date of Patent: Oct. 14, 2025

(54) ELECTRIC SHAVER

(71) Applicant: KONINKLIJKE PHILIPS N.V., Eindhoven (NL)

(72) Inventors: Nikolaj Vasiljevitsj Zjiroecha, Drachten (NL); Jacob Willem Kroon, Leeuwarden (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 26 days.

(21) Appl. No.: 18/281,019

(22) PCT Filed: Aug. 3, 2022

(86) PCT No.: PCT/EP2022/071827

§ 371 (c)(1),
(2) Date: Sep. 8, 2023

(87) PCT Pub. No.: WO2023/036524

PCT Pub. Date: Mar. 16, 2023

(65) Prior Publication Data

US 2024/0198546 A1 Jun. 20, 2024

(30) Foreign Application Priority Data

Sep. 9, 2021 (EP) .................................... 21195710

(51) Int. Cl.
*B26B 21/48* (2006.01)
*B26B 19/38* (2006.01)
*B26B 19/46* (2006.01)

(52) U.S. Cl.
CPC ............ *B26B 21/48* (2013.01); *B26B 19/388* (2013.01); *B26B 19/46* (2013.01)

(58) Field of Classification Search
CPC ....... B26B 19/46; B26B 19/388; B26B 19/14; B26B 19/38; B26B 19/3873; B26B 19/3813; B26B 19/48; B26B 21/40; B26B 21/405; B26B 21/46; B26B 21/48
USPC ............................ 30/34.05, 43.4, 43.5, 43.6
See application file for complete search history.

(56) References Cited

U.S. PATENT DOCUMENTS 5,394,777 A 3/1995 Kozikowski
6,817,101 B1 * 11/2004 Bohmer ................. B26B 21/48 30/140
2007/0032781 A1 2/2007 Henry
2011/0167640 A1 * 7/2011 Flyash .............. A61B 18/1402 30/34.05

(Continued)

FOREIGN PATENT DOCUMENTS

CN 108714917 A 10/2018
DE 202004002937 U1 7/2005

(Continued)

OTHER PUBLICATIONS

International Search Report and Written Opinion of PCT/EP2022/071827, dated Nov. 11, 2022.

*Primary Examiner* — Phong H Nguyen

(57) ABSTRACT

An electric shaver has a lighting module for providing an optical heating function at a skin-contacting surface of the shaving unit and controller for controlling a dual-phase heating for accelerated warming of a skin contacting surface by increasing an average optical power density for an initial time duration.

15 Claims, 11 Drawing Sheets

(56) References Cited

U.S. PATENT DOCUMENTS

| | | | | |
|---|---|---|---|---|
| 2013/0227841 | A1 * | 9/2013 | Solomon | A61B 18/203 30/34.05 |
| 2019/0061183 | A1 | 2/2019 | Neyer | |
| 2020/0069370 | A1 | 3/2020 | Boamfa | |

FOREIGN PATENT DOCUMENTS

| | | | |
|---|---|---|---|
| DE | 102004039176 | A1 | 2/2006 |
| DE | 202015008279 | U1 | 5/2016 |
| EP | 3372357 | A1 | 9/2018 |
| EP | 3782779 | A1 | 2/2021 |
| JP | 2017131179 | A1 | 8/2017 |
| KR | 20000005454 | U | 3/2000 |
| WO | 2014191184 | A1 | 12/2014 |
| WO | 2018100155 | A1 | 6/2018 |

* cited by examiner

ELECTRIC SHAVER

CROSS-REFERENCE TO PRIOR APPLICATIONS

This application is the U.S. National Phase application under 35 U.S.C. § 371 of International Application No. PCT/EP2022/071827, filed on Aug. 3, 2022, which claims the benefit of European Patent Application No. 21195710.5, filed on Sep. 9, 2021. These applications are hereby incorporated by reference herein.

FIELD OF THE INVENTION

The present invention relates to a shaving unit for an electric shaver, and an electric shaver comprising the shaving unit.

BACKGROUND OF THE INVENTION

The invention is in the field of shavers, particularly electric shavers which are designed to perform shaving actions and the like in which hairs are cut at a position close to the skin. In general, an electric shaver comprises a shaving unit where one or more hair-cutting units are located, wherein the shaving unit comprises a base member for the purpose of supporting the one or more hair-cutting units. A particularly common design of the shaving unit uses three hair-cutting units in an equilateral triangular configuration. An electric shaver comprises a main body besides the shaving unit. The main body is normally shaped so as to be suitable to be taken hold of by a user of the shaver and may accommodate various components of the shaver such as an electric motor.

Each hair-cutting unit of the shaving unit comprises a combination of an internal cutting member and an external cutting member which is arranged to cover the internal cutting member, the external cutting member being provided with a series of hair-entry openings for allowing hairs to reach through the external cutting member and encounter the internal cutting member during a shaving action. In a practical design, the external cutting member is generally cup-shaped and has a substantially circular periphery, wherein the hair-entry openings may be shaped like elongated slits extending substantially radially with respect to a central axis of the external cutting member, in one or more annular areas making up one or more hair-cutting tracks. Such an external cutting member is particularly suitable to be used in an electric shaver of the rotary type, i.e. an electric shaver including at least one hair-cutting unit in which the internal cutting member is arranged so as to rotate during operation.

Proper use of the electric shaver involves putting the shaver to an active state, i.e. a state in which the internal cutting member of the at least one hair-cutting unit is rotated, and moving the shaving unit over a portion of skin to be subjected to a shaving action. The external cutting member has a hair-cutting track surface for contacting a portion of skin at the position of the one or more hair-cutting tracks during a hair-cutting action. At positions where the hair-entry openings are delimited, hair-cutting surfaces are present in the external cutting member. In a common design, the internal cutting member includes blades having hair-cutting edges. During a shaving action, hairs entering the hair-entry openings are sheared between the hair-cutting surfaces and the hair-cutting edges, and get cut off at a position close to the skin as a result thereof.

CN 108714917 A discloses an electric shaver comprising a shaving unit and a main body. The shaver is equipped with an infrared heating device, a battery and a switch electrically connected to each other. A reason for equipping an electric shaver with an infrared (or near infrared) heating device such as known from CN 108714917 A is found in the fact that exposure of hairs to infrared light helps to soften the hairs. In general, exposure of hairs to infrared light during a shaving action improves the comfort experienced by the user. Also, the infrared light may also stimulate blood circulation, and have a beneficial effect on the skin, by stimulating the skin and invoking a radiant look of the skin.

Not only infrared light, but other optical emissions can be used to generate a heating stimulus, including in the visible light spectrum.

It takes some time for the lighting elements to warm the shaver head to an optimal temperature for skin-application. Increasing the power to the lighting elements can increase the rate of warming. However, this carries safety and comfort issues, since increased power may cause burning. An improvement to existing devices which is able to address this shortcoming would be of value.

SUMMARY OF THE INVENTION

The invention is defined by the claims.

In accordance with an aspect of the invention, there is provided an electric shaver comprising a shaving unit and a controller. The shaving unit comprises one or more hair-cutting units. The shaving unit further comprises a lighting module comprising one or more lighting elements and a skin-facing light output surface via which light generated by the lighting elements is exposed to skin during operation of the shaving unit, said light output surface being made from an optically transmissive material and being arranged for contacting the skin during operation of the shaving unit. The lighting elements are arranged in thermally conductive contact with the light output surface via a thermally conductive pathway in the lighting module.

The shaving unit further comprises a supporting member supporting the one or more hair-cutting units and the lighting module.

The controller of the shaving unit is operatively coupled with the lighting module and adapted to control the lighting elements in a drive scheme which comprises:

- an initial heat-up phase, triggered upon activation of the lighting module, in which the lighting elements are driven with an initial power setting; and
- an operational phase following the initial heat-up phase. A maximum power value of the operational power setting is lower than a power value of the initial power setting. Optionally, the initial heat-up phase may target a pre-determined temperature, wherein the lighting elements are driven with the initial power setting until a predetermined temperature of the light output surface is reached.

Preferably, in the operational phase, the lighting elements are driven with an operational power setting such that the temperature of the light output surface is controlled to be maintained at the predetermined temperature reached in the initial heat-up phase. In other words, the lighting elements are controlled to regulate the temperature, to maintain it as close as possible to the predetermined temperature.

The lighting module of the electric shaver according to the invention is able to provide a heating effect to the skin during the shaving process. The heating effect is achieved both optically and conductively. Optical heating of the skin is achieved by optical absorption by the skin tissue of the light generated by the lighting elements and applied to the skin via the light output surface of the lighting module. Conductive heating of the skin is achieved by thermal contact of the skin with the light output surface of the lighting module which is in thermally conductive contact with the lighting elements. Thus, conductive heating of the skin is particularly achieved by the heat that is dissipated by the lighting elements as a result of their limited electrical-to-optical energy conversion efficiency. This combined optical and conductive heating of the skin is very effective.

The invention provides an initial heat-up phase which acts as a temporary 'boost' mode, for more rapidly heating the light output surface of the lighting module using an initial power setting that is higher than the maximum power value of the operational power setting during the operational phase following the initial phase. Whereas the maximum power value of the operational phase is to be selected such that it is comfortable and safe to use throughout prolonged use of the shaver during the shaving process, the initial heat-up phase allows the use of a power setting above the safety limits for prolonged use in order to more rapidly heat-up the light output surface of the lighting module. Once the boost mode is complete, the power level is decreased. This may e.g. be indicated to the user by a changing visible indicator light pattern or an audible sound, and the shaver can then be used normally, e.g. with the light output surface at an optimal temperature. This avoids that the higher power is maintained throughout operation, therefore avoiding safety and comfort issues, e.g. skin burns.

The predetermined temperature targeted by the initial heat-up phase is preferably within a range from 40° C. to 50° C.

Since the light output surface contacts the skin during use, this temperature range targets a temperature within a comfort tolerance of a user. For example, normal facial temperature is around 36° C. (where this may vary depending upon environmental conditions). The perception sensitivity of the average person is around 2° C. Therefore a perceivable warming action preferably targets a temperature above this perception threshold, and wherein, to avoiding excessive heat (and burning), an optimum range may be between 40° C. to 50° C.

In some embodiments, the pre-determined temperature may be within a range from 41.8° C. to 42.2° C., within a range from 44.8° C. to 45.2° C., or within a range from 47.8° C. to 48.2° C.

It may be advantageous to provide the electric shaver with an input member configured to enable selection of the predetermined temperature by a user of the electric shaver.

In some embodiments, the one or more lighting elements may comprise one or more LEDs.

In some embodiments, the one or more lighting elements may comprise an infrared (IR) or near infrared (NIR) lighting element.

An optical power density of the lighting elements at the light output surface may need to be configured to maximize warming efficiency while mitigating risk of discomfort or skin damage. In some embodiments, the lighting module may be configured such that a light beam of at least one of the lighting elements has, during the initial heat-up phase, a highest average optical power density at the light output surface compared with the other lighting elements, and wherein the power value of the initial power setting is such that said highest average optical power density is between 325 mW/cm$^2$ and 360 mW/cm$^2$.

This embodiment is based on the insight that the light beam of at least one of the lighting elements will have a highest average optical power density at the light output surface of the lighting module. In this context, the average optical power density of the light beam is measured over the cross-section of the light beam at the position of the light output surface. This highest average optical power density should not exceed a value of 360 mW/cm$^2$ and should preferably be between 325 mW/cm$^2$ and 360 mW/cm$^2$. These values are selected such that, in a worse case use scenario wherein a user holds the electric shaver in a stationary position on the skin for a predefined period of time, the total optical energy density applied by the lighting module to the skin at the position of the light beam of said at least one of the lighting elements will not exceed the skin safety limits defined by the IEC/EN 62471 standards "Photobiological Safety of Lamps and Lamp Systems". In particular, the predefined period of time is 10 seconds. This is to maximize the warming effect (which depends upon optical power density) during the initial power, while not exceeding safe limits.

In some embodiments, the activation of the lighting module may be triggered by activation of the one or more hair-cutting units, for example triggered by the controller upon said activation, or triggered automatically due to a wiring arrangement between the cutting units and the lighting module.

In some embodiments, the electric shaver may comprise a further input member configured to enable a user of the electric shaver to activate the lighting module independently from activation of the one or more hair-cutting units.

In some embodiments, the time duration of the heat-up phase may be set to be no greater than 20 seconds, and preferably no greater than 10 seconds.

In one advantageous set of embodiments, the electric shaver may further comprise a temperature sensor, and wherein the controller is configured, in the operational phase, to control a power setting of the operational phase in dependence upon an output from the temperature sensor. In other words, the controller actively regulates the power level of the lighting elements in a feedback loop with the temperature sensor, so as to target maintenance of a particular temperature (raising power responsive to fall in temperature, reducing power responsive to rise in temperature). In other words, the operational phase is a controlled as a steady state phase with regards to temperature, in which lighting power is regulated for maintenance of a constant temperature range. This is in contrast to the heat-up phase where power is set to achieve a rapid escalation in temperature.

The temperature sensor is preferably located in the shaving unit.

In some embodiments, the controller may be configured to control a duration of the initial heat-up phase and, in the operational phase, to control the temperature of the light output surface, in dependence on an output from the temperature sensor.

In some examples, the controller comprises a feedback control loop comprising the temperature sensor and a proportional-integral (PI) control member.

In some embodiments, the lighting module comprises a PCB, and wherein the lighting elements are mounted to a first main surface of the PCB facing the light output surface such that the lighting elements are in optical communication with the light output surface during operation of the lighting module. The aforementioned temperature sensor may also be mounted to said main surface of the PCB, and may be mounted thereon in a position immediately adjacent to one of the lighting elements. In other words, the temperature sensor is located next to at least one of the lighting elements for maximizing thermal coupling between the two.

The previously mentioned thermally conductive pathway (from the lighting elements to the light output surface) may comprises (i.e. be facilitated by) an optically transmissive potting material that covers the main surface of the PCB thereby encapsulating the lighting elements and the temperature sensor.

For instance, in some embodiments, the lighting module has a cavity which is covered by an optically transmissive upper wall of the lighting module that comprises the light output surface. The PCB may be arranged in said cavity, and wherein the potting material extends between the main surface of the PCB and the upper wall of the lighting module.

The electric shaver may comprise a shaver main body coupled to the shaving unit and comprise an electric motor for driving the one or more hair-cutting units of the shaving unit. The one or more hair-cutting units of the shaving unit may each comprise an external cutting member with a plurality of hair-entry openings and an internal cutting member with a plurality of cutting elements covered by the external cutting member and movable relative to the external cutting member. The controller may be accommodated in the shaver main body. In some embodiments, the shaving unit is a removable attachment to the shaver main body.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
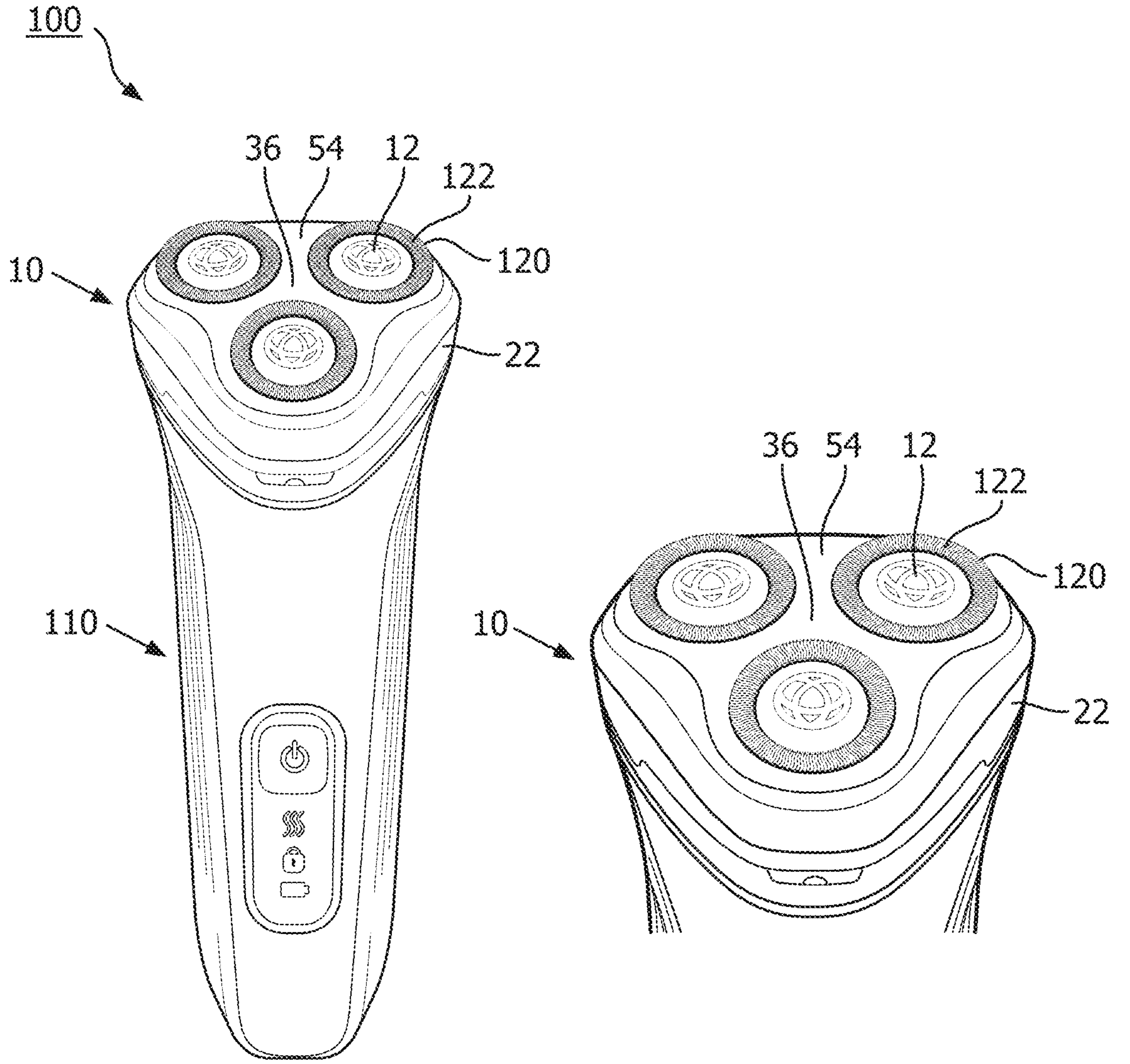
FIG. 1 shows a perspective view of the exterior of an example electric shaver according to one or more embodiments of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

This disclosure relates generally to a shaving unit and/or electric shaver having a lighting module for providing an optical heating function at a skin-contacting surface of the shaving unit. At least one aspect of the invention relates to a dual-phase control scheme for accelerated warming of a skin contacting surface by increasing an average optical power density for an initial time duration.

FIG. 1 shows a first perspective view of the visible exterior of an example shaving unit 10 for an electric shaver 100 according to at least one embodiment of the invention. In the shown example, the electric shaver 100 is of the rotary type (although this is not essential) and comprises a main body 110 that is intended to be taken hold of by a user of the shaver 100, and a shaving unit 10 that is intended to contact a portion of skin to be subjected to a shaving action. The main body 110 of the shaver 100 is also commonly referred to as a handle, and the shaving unit 10 of the shaver 100 is also commonly referred to as a shaving head. For various reasons, such as a need to service and/or clean the shaving unit 10, a need to replace the shaving unit 10 by a functional unit of another type, etc., it is practical if the shaving unit 10 is removably or hingably mounted to the main body 110. The shaving unit 10 includes a number of hair-cutting units 12, the number being three in the shown example. In the shown example, the hair-cutting units 12 are arranged in a generally triangular formation. When the electric shaver 100 is applied for the purpose of subjecting a portion of skin to a shaving action, the actual process of cutting off hairs protruding from the portion of skin takes place at the position of the hair-cutting units 12. For the purpose of supporting the hair-cutting units 12, the shaving unit 10 comprises a supporting member 22 which, in this example, acts as a base member for the shaving unit 10.

Each of the hair-cutting units 12 comprises a combination of an external cutting member 120 that is of a generally cup-shaped design and an internal cutting member (not shown) that is equipped with at least one hair-cutting element and that is at least partially accommodated in the interior of the internal cutting member. The external cutting member 120 has hair-entry openings 122 in an annular cutting track surface. During a shaving action, hairs extending through the hair-entry openings 122 and protruding to the interior of the external cutting member 120 are cut off as soon as they are encountered by a hair-cutting element of the internal cutting member. A shaving action as mentioned can be performed when the internal cutting member is activated to rotate and a portion of skin is actually contacted by the external cutting member 120 at the position of the cutting track surface. Activation of the internal cutting member may take place in a known manner by means of a drive mechanism of the shaver 100 comprising an electric motor. The main body 110 may house the drive mechanism, optionally along with a local power source (e.g. battery). When the combination of the external cutting member 120 and the internal cutting member is moved over the portion of skin while the internal cutting member is driven to rotate, it is achieved that hairs protruding from the portion of skin are caught in the hair-entry openings 122 of the external cutting member 120 and are cut off in that position.

It is noted that the invention also covers electric shavers and shaving units having one or more hair-cutting units of a different type as described here before. In particular the invention also covers electric shavers and shaving units having hair-cutting units with an internal cutting member arranged to linearly reciprocate relative to an external cutting member.

The shaving unit 10 upper surface comprises a skin-contacting surface 54, at least a portion of which is formed by, or forms, a light-output surface 36 for a lighting module integrated in an interior of the shaving unit 100, as will be further described below.

It is to be noted that the foregoing general information about the electric shaver 100 according to the first embodiment of the invention (description of which is to follow) is compatible with (though not necessarily essential to) all subsequently described embodiments of the invention.

Figure 2A:
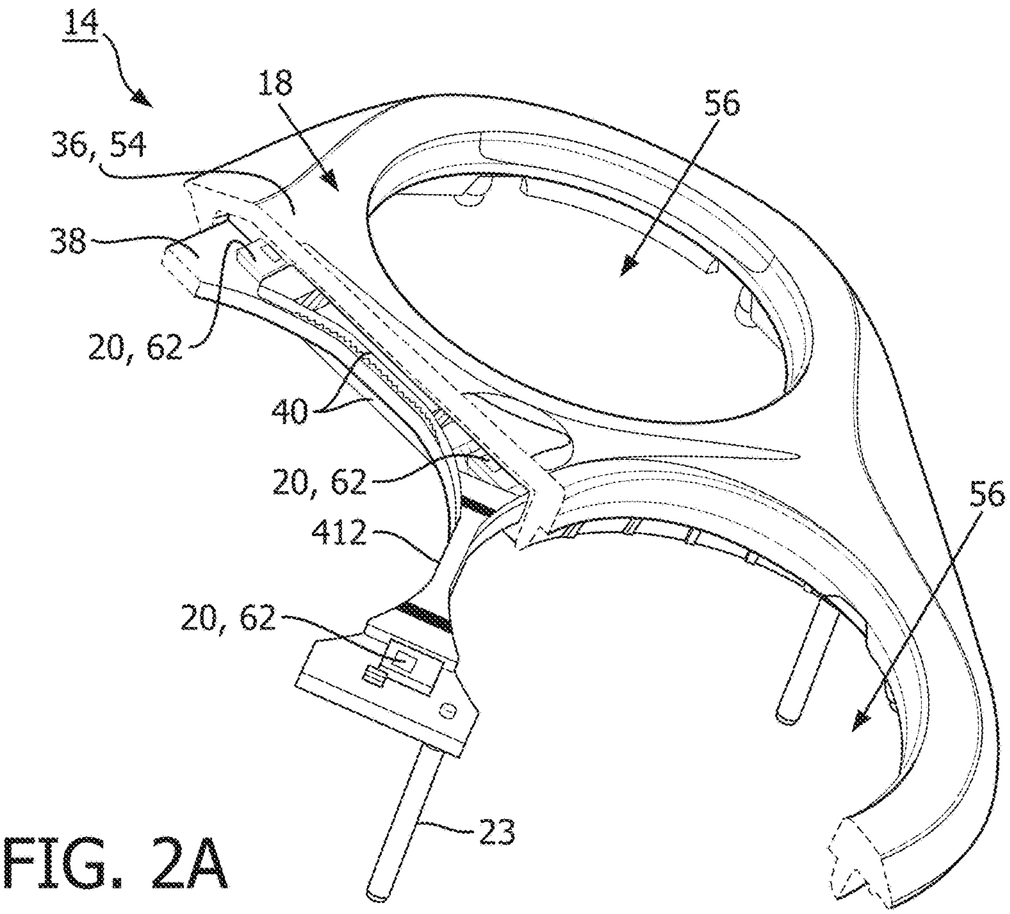
FIG. 2 shows a perspective cut-away view of a shaving unit according to an aspect of the invention.
Figure 2B:
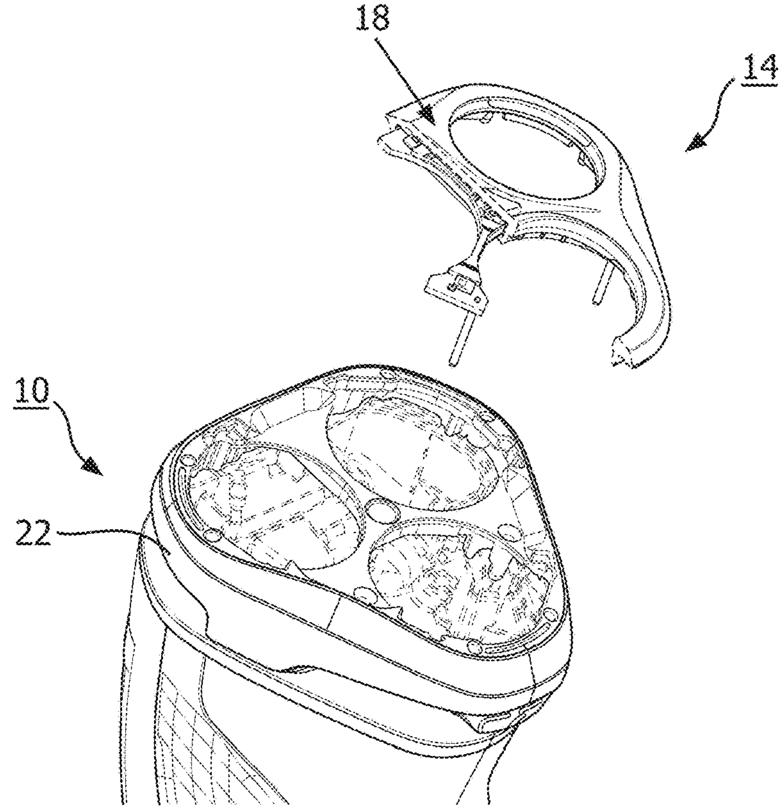
Figure 3A:
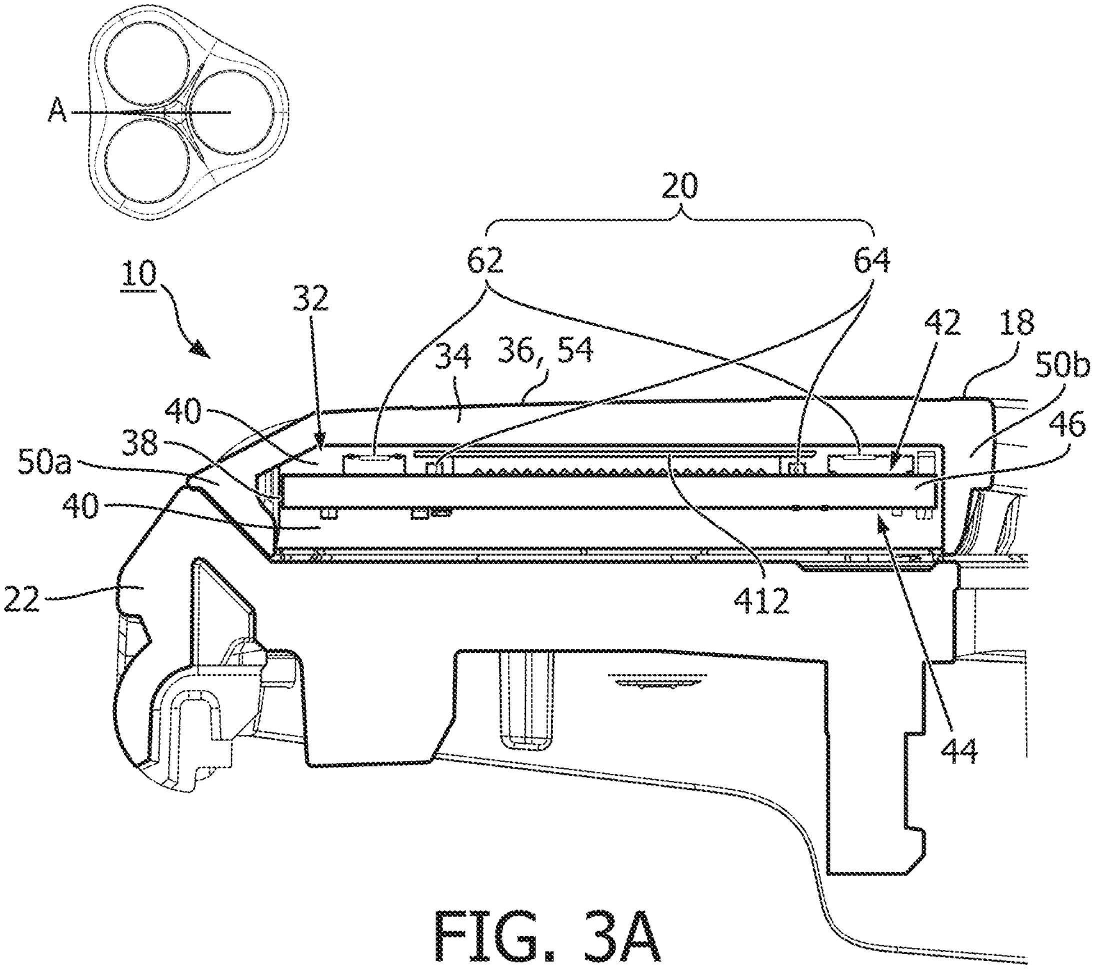
FIG. 3 shows a cross-sectional view through a lighting module of a shaving unit according to one or more embodiments of the invention.
Figure 3B:
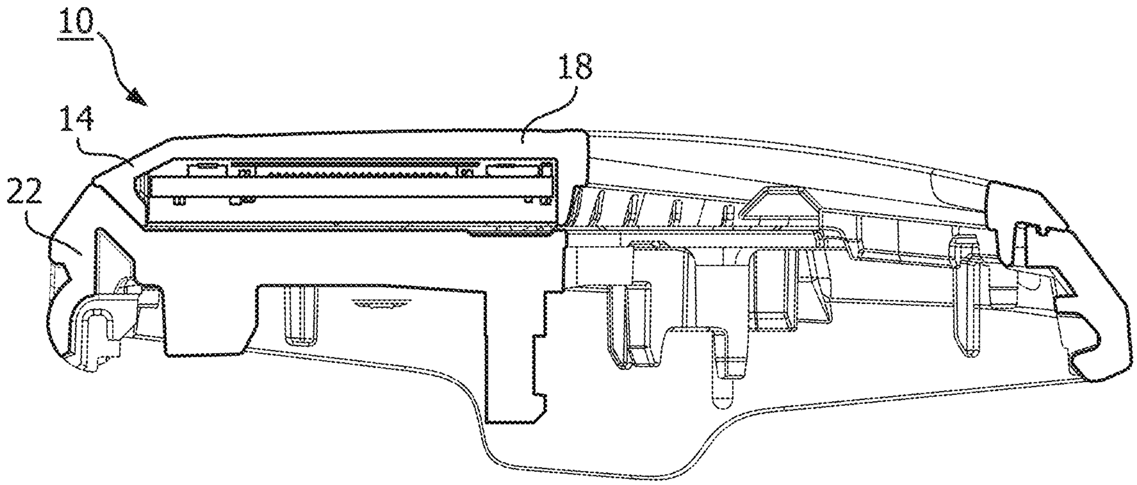
Figure 4:
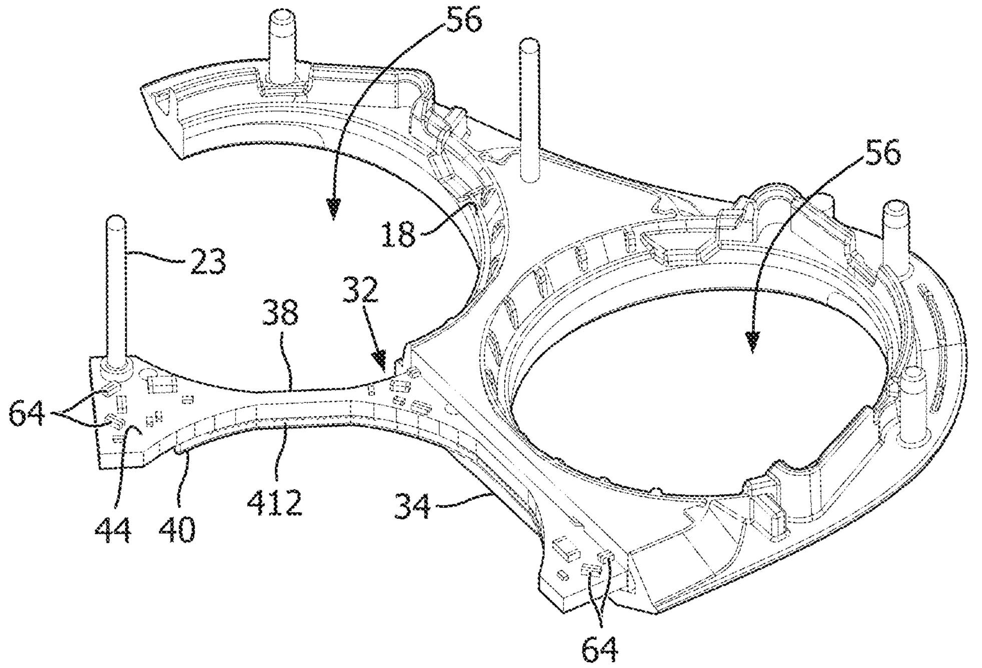
FIG. 4 shows an interior part cut-away view of a lighting module housing according to one or more embodiments of the invention.
Figure 5:
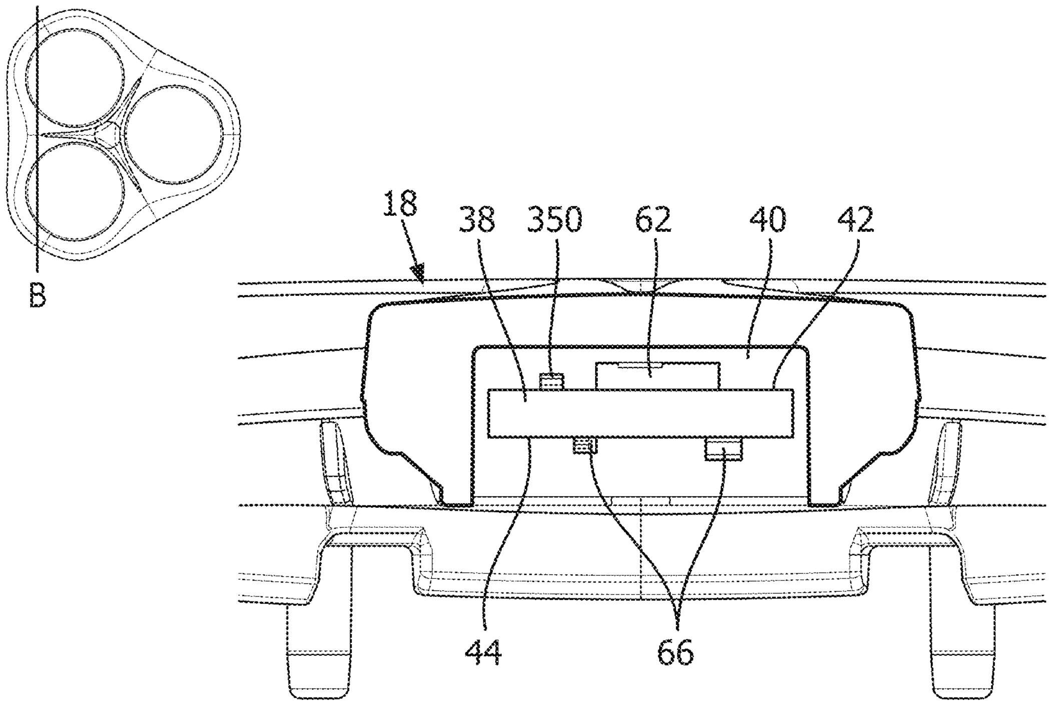
FIG. 5 shows a further cross-sectional view through the lighting module according to one or more embodiments of the invention.
Figure 6A:
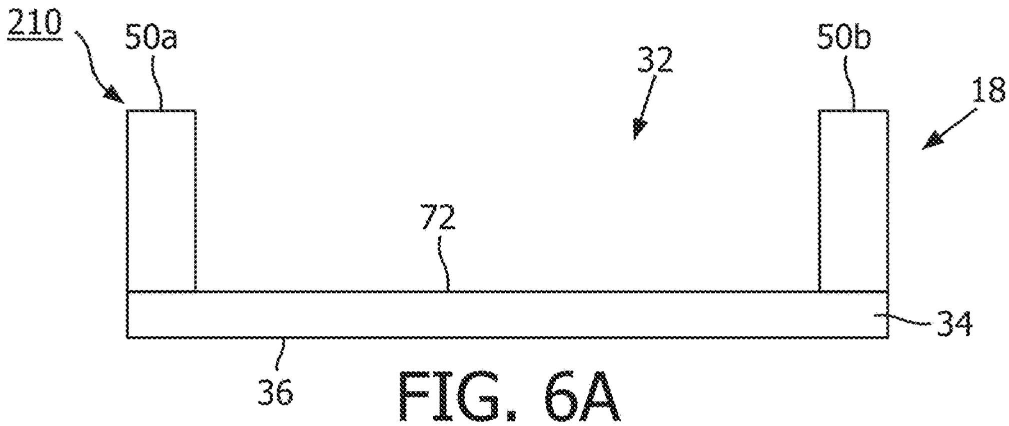
FIG. 6 shows stages of an example method of fabricating a lighting module according to one or more embodiments of the invention.
Figure 6B:
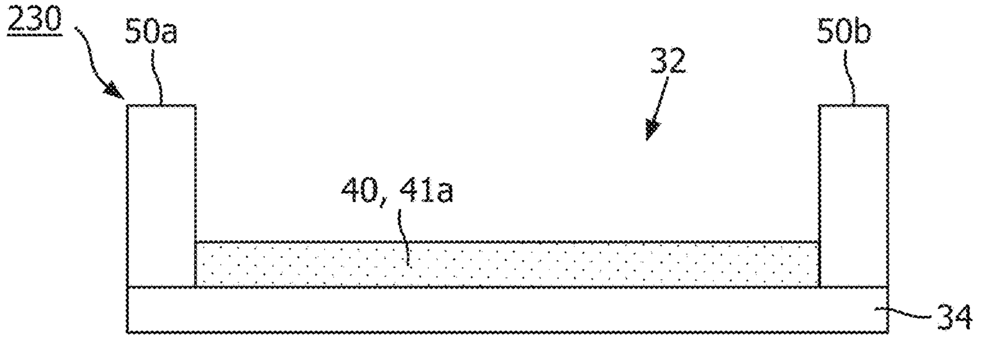
Figure 6C:
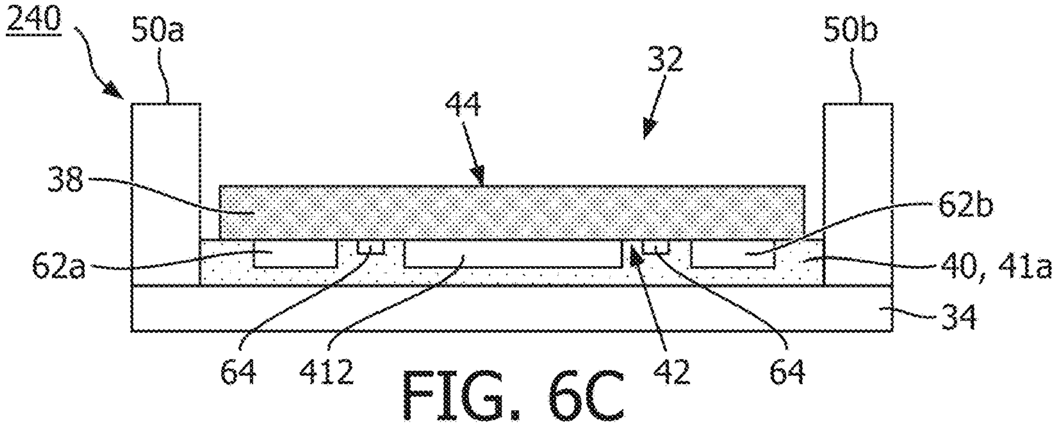
Figure 6D:
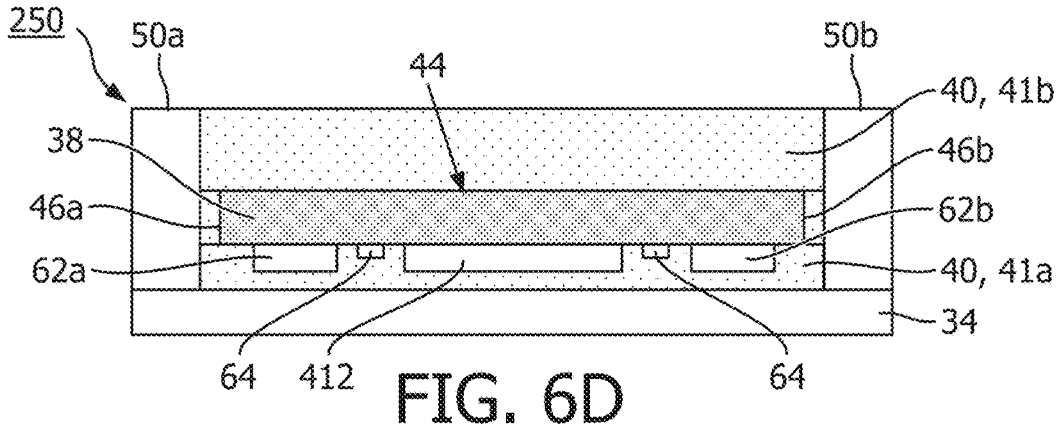

FIG. 2 shows an exploded view of an example shaving unit 10 according to one or more embodiments. In particular, FIG. 2A shows a close-up part-cut-away interior view of the shaving unit 10, and FIG. 2B shows a wide exploded view of the shaving unit. FIG. 3 shows a cross-section through the shaving unit 10 along the line A shown in FIG. 3. FIG. 4 shows an underside interior view of a portion of the shaving unit 10. FIG. 5 shows a cross-sectional view through the shaving unit 10 along the line B shown in FIG. 5.

The shaving unit 10 comprises a lighting module 14 comprising a lighting module housing 18 which accommodates one or more lighting elements 20. In this example, the lighting module housing 18 is arranged on the supporting member 22 of the shaving unit 10 and forms a part of a shaving unit housing. In particular, the lighting module housing 18 forms an upper portion of the shaver unit housing, and the supporting member 22 acts to support the one or more hair-cutting units 12 and the lighting module 14. The lighting module housing 18 delimits one or more openings 56 within which a respective one of the one or more hair-cutting units 12 is disposed in the shaving unit 10. However, this formation is not essential. For example, the lighting module could be a fully separate structural unit integrated inside a separate housing of the shaving unit; the depicted design confers an additional structural efficiency but is not essential to the inventive concept.

The lighting module 14 further comprises electrical connection pins 23 which extend downward from the lighting module 14 for electrically contacting complementary electrical contacts in the main body 110, for providing electrical connection between the lighting module 14 and the shaver body 110 in the assembled configuration.

The lighting module housing 18 defines an interior cavity 32, and the lighting elements 20 are arranged in the cavity 32. The cavity 32 is covered on a skin-facing side of the lighting module housing 18 by an upper wall 34 of the lighting module housing. The upper wall incorporates a skin-facing light output surface 36 via which light generated by the lighting elements 20 is exposed to skin during operation of the shaving unit. The upper wall 34 is made from an optically transmissive material, wherein said optically transmissive material provides the light output surface. In other examples, the upper wall 34 may incorporate the light output surface as a sub-region within a wider wall area, such that the light output surface forms a light output window through the upper wall.

In the illustrated example, the lighting module housing 18 further comprises side walls 50*a*, 50*b* which define the cavity 32 in combination with the upper wall 34 of the lighting module housing 18.

In the illustrated example, the upper wall 34 of the lighting module housing 18 at least partially defines a skin-contacting surface 54 for the shaving unit 10, and the aforementioned light output surface 36 incorporated in the upper wall 34 is arranged for contacting the skin during operation of the shaving unit.

The lighting module housing 18 may in some examples be a one-piece structure. It may be an injection molded component. It may be formed from plastic.

The lighting module 14 comprises a carrier such as a printed circuit board (PCB) 38 arranged in the cavity 32, wherein the lighting elements 20 are mounted to a first main surface 42 of the PCB (best seen in FIG. 3) facing the upper wall 34 of the lighting module housing 18 such that the lighting elements 20 are in optical communication with the light output surface 36 during operation of the shaving unit 10.

The cavity 32 contains an optically transmissive potting material 40 (best seen in FIG. 3) which covers the first main surface 42 of the PCB, thereby encapsulating the lighting elements 20. The potting material 40 extends between the first main surface of the PCB 38 and the upper wall 34 of the lighting module housing 18. The potting material 40 also covers a second main surface 44 of the PCB 38, opposite to the first main surface 42 (i.e. a reverse side or underside of the PCB 38). The potting material 40 thereby encapsulates the PCB 38 on all main sides. The potting material provides a thermally conductive pathway in the lighting module 14 between the lighting elements 20 and the light output surface 36, to thereby place the lighting elements 20 in thermally conductive contact with the light output surface 36. The potting material 40 also provides a waterproofing function, as explained further below.

The lighting elements 20 are adapted for providing a skin-heating effect at the light output surface 36 of the lighting module housing 18 when in contact with the skin during operation. That is to say, when the lighting elements 20 of the lighting module 14 are activated during a shaving action, it is achieved that the skin is subjected to thermal stimulation, which may lead to improvement of the condition or appearance of the skin and/or improvement of shaving comfort. In the illustrated example, this is achieved through inclusion among the lighting elements 20 of one or more infrared (IR) or near infrared (NIR) lighting elements 62. These provide a light output having dominant frequency components in the IR or NIR bands of the electromagnetic (EM) spectrum. The IR or NIR bands have particularly good penetration depth into the skin. The optically transmissive material of the upper wall 34 of the lighting module housing 18 and/or the potting material 40 may have an optical transmissivity profile wherein at least one peak in the optical transmissivity profile is within the optical wavelength range of 800-1050 nm, to maximize optical coupling from the IR or NIR lighting elements 20, 62 to the light output surface 36.

In addition to the optically induced skin-heating effect of the IR or NIR lighting elements 20, 62, which results from optical absorption by the skin tissue of the IR or NIR light emitted by the lighting elements 20, 62, the lighting elements 20 also provide a conductively induced skin-heating effect as a result of the thermally conductive pathway between the lighting elements 20 and the light output surface 36 provided by the potting material 40. As a result of said thermally conductive pathway, the light output surface 36 is heated by the thermal energy that is dissipated by the lighting elements 20 as a result of their limited electric-to-optical conversion efficiency. Thus, during the shaving process the skin is also conductively heated as a result of its thermally conductive contact with the light output surface 36. The combined optically induced and conductively induced skin-heating effects provide a high skin-heating efficiency of the lighting module 14 in the shaving unit 10.

It is not essential that the lighting elements 20 include IR or NIR lighting elements, since optically-induced heating is feasible using other portions of the EM spectrum, for example, with visible lighting elements. In some cases, optical components such as lenses could be used in combination with visible lighting elements to focus or concentrate the light output, to thereby increase the thermal power of the light at the light output surface.

Furthermore, although at least one function of the lighting module is to provide a heating effect, optical emissions can provide other beneficial effects to skin tissue in addition. For example, it is known that blue visible light is beneficial for acne treatment and red visible light is beneficial for stimulating wound healing and treating skin inflammation.

In the illustrated example, in addition to the IR or NIR lighting elements 62, the set of lighting elements 20 further include one or more visible lighting elements 64 for providing a visible light indication of the activation of the IR or NIR lighting elements. They may be configured to be active when the IR or NIR lighting elements are active, either through active control by a controller, or through a parallel wiring arrangement with the IR/NIR lighting elements 62 in a circuit arrangement that electrically supplies them. The visible lighting elements might be omitted in further examples however.

Where visible lighting elements 64 are provided, the optically transmissive material of the upper wall 34 of the lighting module housing 18 and/or the potting material 40 may have at least one further peak in the optical transmissivity which is within the optical wavelength range of 450-700 nm, to maximize optical coupling from the visible lighting elements 64 to the light output surface 36.

Each lighting element 20 of the one or more lighting elements may comprise an LED in some examples.

The lighting module 14 comprises one or more electric connection members 23 (connection pins) electrically connected to the PCB 38 and extending from the second main surface 44 of the PCB through and out of the potting material 40.

With regards to the potting material 40, this is for providing a dual function of inhibiting ingress or moisture or other contaminants into the cavity 32 (such as dirt or dust), and also for providing a thermal coupling function from the lighting elements 20 to the light output surface 36 (and therefore to the skin surface during normal use of the electric shaver 100).

Preferably, the potting material 40 extends uninterrupted from the first main surface 42 of the PCB 38 to the upper wall 34 of the lighting module housing 18. In other words, it defines at least one continuous solid material path from the first main surface of the PCB to the upper wall 34 of the lighting module housing 18. This ensures a solid thermal conduction path from the lighting elements 20 on the first main surface 42 of the PCB 38 to the light output surface 36 in the upper wall 34 of the lighting module housing 18, optimizing heat conduction.

Preferably, the manufacture of the lighting module 14 should be such that air bubbles in the potting material 40 are minimized or even eliminated, since air bubbles diminish the overall thermal conductivity of the thermally conductive pathway from the PCB first main surface 42 to the light output surface 36. Air bubbles also adversely affect homogeneity of temperature distribution. One particularly advantageous fabrication method will be outlined later in this disclosure.

Preferably, the potting material 40 extends as a continuous monolithic structure between the PCB 38 and the light output surface 36, i.e. without interruption. At minimum it should include at least one continuous solid path from the PCB 38 to the light output surface 36.

The PCB 38 during assembly of the lighting module 14 should preferably be fully wetted by the potting material 40 on both of its main surfaces 42, 44.

For effective prevention of moisture ingress, there should be chemical bounding or adherence between the potting material 40 and the first and second main surfaces 42, 44 of the PCB 38. There should also be chemical bounding between the potting material 40 and the interior surfaces of the cavity 32, i.e. the interior surfaces of the upper wall 34 and side walls 50*a*, 50*b*.

For effective waterproofing, there preferably should also be chemical bounding or adherence between the potting material 40 and the electric contact pin 23. This helps prevent water ingress via the surfaces of the electric contact pins 23.

Preferably, the potting material 40 at least partially covers an edge surface 46 of the PCB 38 extending between the first and second main surfaces 42, 44.

Suitable materials for the potting material 40 may include for example a glue resin, for example a silicon or epoxy resin. However, in general, any encapsulation or filler material may be used. Preferably, the material is one which, within the functional temperature range of the lighting module 14, exhibits the following properties: (a) does not change phase; (b) does not (substantially) change its mechanical, thermal or optical properties; (c) does not exhibit discoloration. The functional temperature range may be for example between −10° C. and 100° C., with an actual target operating temperature typically around 40-60° C. The broader temperature range allows for variation in environmental conditions, e.g. shaver left outside in cold environment, or shaver left inside a hot car in the sun.

With regards to the optical functionality of the lighting module 14, optionally, and as illustrated in FIGS. 2-4, the lighting module may further comprise an optical arrangement for creating a visible light output provided at the light output surface 36 by the optional visible lighting elements 64. In this example, this comprises a light guiding arrangement 412 configured to guide the visible light generated by the visible lighting elements 64 to at least one area of the light output surface 36 of the lighting module 14. The light guiding arrangement 412 may comprise a light guiding sheet or film disposed on or over the first main surface 42 (upper surface) of the PCB 38. It may be adhered to the PCB 38 with an adhesive layer. It may be a light guiding sticker. This may guide light in a direction with a main directional component parallel with the light output surface 36 in some examples. There optionally may also be provided light attenuating elements for inhibiting or attenuating a direct optical path from each visible lighting element 64 to the light output surface 36. The light attenuating elements may each be facilitated by a light attenuating layer, for example comprising a light attenuating mask layer deposited on an optically transparent carrier layer disposed atop the light guiding arrangement. These features will be described in more detail later in this disclosure.

With regards to the optical functionality of the lighting module 14, in some examples the lighting module housing 18 may be entirely made from the previously mentioned optically transmissive material (of which the light output surface 36 is formed). It may be optically translucent, e.g. scattering, to prevent direct visibility of an interior of the lighting module 14 cavity 32 from the visible surface of the shaving unit 10. This allows for the whole body of the lighting module housing 18 to provide a light coupling function from the lighting elements 20 to the light output surface 36 and skin contacting surface 54 of the shaving unit 10. The lighting module housing 18 may optionally be a single-piece injection-molded polymer structure.

As previously mentioned, the lighting module housing 18 in this example comprises a skin-contacting surface 54 arranged to be in contact with the skin during operation of the shaving unit 10. The light output surface 36 forms at least a part of this skin-contacting surface 54. The skin-contacting surface 54 delimits one or more openings 56 within which a respective one of the one or more hair-cutting units 12 of the shaving unit 10 (when assembled) is disposed. In the illustrated example, the one or more hair-cutting units 12 are each fully surrounded by the skin-contacting surface 54, although this is not essential (for example in a foil-shaver configuration, the skin contact surface may extend around only a subset of the sides of each elongate hair-cutting unit).

As can be seen from FIG. 2, the light output surface 36 of the lighting module 14 extends at least in an area of the skin-contacting surface 54 between each of the plurality of hair-cutting units 12.

In the example of FIGS. 2-5, all lighting elements 20 are mounted to a first main surface 42 of the PCB, which faces the light output surface 36. However, this is not essential. In some embodiments, one or more of the lighting elements 20, in particular one or more visible lighting elements, may be mounted to the second main surface 44 of the PCB (i.e. un underside surface).

FIG. 4 shows an underside view of the PCB 38 of a lighting module in accordance with such an example. FIG. 4 shows a part cut-away view illustrating components on the second main surface 44 (i.e. underside surface) of the PCB 38. In this example, a plurality of visible lighting elements 64 are provided on the second main surface of the PCB. These may be provided in addition to visible lighting elements on the aforementioned first main surface 42 of the PCB 38, or instead of visible lighting elements on the first main surface 42 of the PCB.

In some embodiments, there may further be provided at least one temperature sensor 350, such as a thermistor, on the PCB 38 (see FIG. 5). This is preferably positioned adjacent to at least one of the IR or NIR lighting elements 62. The temperature sensor 350 may be used by a controller for regulating a power level of the IR or NIR lighting elements 62, for regulating a temperature at the light output surface 36. The temperature sensor 350 is optional however and may be omitted.

The lighting module may comprise one or more further electrical components mounted to the PCB 38, for example one or more resistors 66, as illustrated in FIG. 5.

Steps forming at least part of a suitable fabrication method for the lighting module 14 of the shaving unit 10 shown in FIGS. 2-5 are schematically illustrated in FIGS. 6A-6D. The steps shown in FIGS. 6A-6D are for assembly of at least a section of the lighting module 14.

The method comprises (FIG. 6A) providing 210 a lighting module housing 18 comprising an upper wall 34, which comprises a light output surface 36, and side walls 50*a*, 50*b* defining, in combination with the upper wall 34, a cavity 32 of the lighting module housing 18. The upper wall 34 has an internal surface 72 facing into the cavity 32.

The method further comprises (step not explicitly shown in FIGS. 6A-6D) providing a lighting unit comprising a PCB 38 and one or more lighting elements 20 mounted to a first main surface 42 of the PCB 38. The lighting elements 20 may include IR or NIR lighting elements 62 and/or visible lighting elements 64. The lighting unit may further comprise an optical arrangement, for example including a light guiding arrangement 412 disposed on the first main surface 42 of the PCB 38.

The method further comprises (FIG. 6B) disposing 230 on the internal surface 72 of the upper wall 34 a layer 41*a* of the optically transmissive potting material 40. The internal surface 72 is preferably fully wetted by the layer of potting material.

The method further comprises placing 240 the aforementioned lighting unit, comprising the PCB 38 and lighting elements 62, 64, onto the layer 41*a* of the potting material 40 in the cavity 32, with the first main surface 42 of the PCB 38 facing toward the upper wall 34, so that the first main surface 42 of the PCB is wetted by the potting material 40 and the lighting elements 62, 64 are each encapsulated by the potting material.

The method further comprises providing 250 a further layer 41*b* of the potting material 40 over the lighting unit to cover the second main surface 44 of the PCB 38 opposite to the first main surface 42, whereby the lighting unit is fully encapsulated by the potting material on the first and second main surfaces 42, 44 of the PCB 38. The potting material also preferably covers side edges 46*a*, 46*b* of the PCB 38.

The method further comprises setting the potting material.

The result of this method is a PCB 38 with lighting elements 62, 64 carried thereon integrated in the lighting module housing 18 which is on all sides sealed and wetted by potting material 40. The potting material has a chemical bonding towards all parts with which it is in contact.

The method further comprises a step of including the lighting module 14 as part of the shaving unit 10 such that, during operation of the shaving unit, the light output surface 36 comes into contact with skin of a user when applying the shaving unit to the skin for shaving. This step may be achieved through assembling of the lighting module 14 on the supporting member 22 of the shaving unit 10 during a subsequent manufacturing process of the shaving unit 10.

The setting step could be performed as a single step after both layers 41*a*, 41*b* of the potting material have been deposited, or a first setting step could be performed after depositing the first layer 41*a* and positioning the lighting unit, and then a second setting step after depositing the second layer 41*b* on the lighting unit.

The above method provides particularly effective encapsulation, and also minimizes bubble formation in the potting material layers, for optimum thermal conductivity and temperature homogeneity of the potting material.

Instead of depositing the potting material 40 in a two-layer deposition process, a single, deeper layer of potting material might be deposited in the cavity 32 and then the lighting unit submerged into the potting material. This may be less practical however, especially when being performed in bulk manufacturing.

Preferably the potting material 40 is a material which provides optical transmissivity of light from the IR or NIR lighting elements 62 to outside of the lighting module 14 (via the light output surface 36) of at least 90%.

Optionally, the lighting module housing 18 may be formed of an optically transmissive material, wherein preferably this material provides optical transmissivity of the light from the IR or NIR lighting elements 62 to the outside of the lighting module 14 of at least 70%.

Preferably the potting material 40 and the lighting module housing 18 have a thermal conductivity of at least 0.2 W/mK.

Preferably the specific heat capacity of the potting material 40 is at least 800 J/KgK.

Preferably the specific heat capacity of the lighting module housing 18 is at least 1250 J/KgK.

Optionally, an operating temperature range of the IR or NIR LEDs may be between −10° C. and 100° C.

Optionally, an operating temperature range of the potting material 40 may be between −10° C. and 100° C.

Optionally, an operating temperature range of the lighting module housing 18 may be between −10° C. and 80° C.

Preferably the potting material 40 should be chemically resistive, and should be robust in terms of its material properties to frequent temperature cycling.

The electric shaver 100 further includes a controller (not shown) for controlling the lighting elements 20. The controller may be accommodated in the shaver main body 110. The controller may include at least one processor. The controller may be arranged to receive a signal or to receive data from one or more sensors included on the PCB, e.g. a temperature sensor.

An aspect of the invention is the provision of a novel control scheme for the lighting elements 20 to optimize temperature regulation of the light output surface 36. The shaving unit 10 in the examples described below may be the same or similar to that described above. In particular, all features of the above-described electric shaver 100 and shaving unit 10 are compatible with the below-described set of embodiments of the invention, but some may be omitted. For example, the potting material described above is not essential.

In accordance with one or more embodiments, an electric shaver 100 is provided comprising a shaver unit 10 (e.g. as described above), and comprising a controller operatively coupled with the lighting module 14 and adapted to control the lighting elements 20 in a drive scheme which comprises at least a first and second phase. The controller may be accommodated in the shaver main body 110. The drive scheme comprises an initial heat-up phase, triggered upon activation of the lighting module, in which the lighting elements 20 are driven with an initial power setting. The drive scheme further comprises an operational phase following the initial heat-up phase, in which the lighting elements 20 are driven with an operational power setting. A maximum power value of the operational power setting is lower than a power value of the initial power setting. The initial heat-up phase may target a pre-determined target temperature for the light output surface 36. This may be done implicitly (blindly) through executing a pre-determined power profile with a defined duration which is known or predicted to result in the target temperature. Alternatively, it may be done actively, through use of an input from a temperature sensor as feedback to guide one or both of the power setting and the time duration of the initial heat-up phase.

In some examples, in the operational phase, the temperature of the light output surface may be controlled to be maintained at the predetermined temperature through active control of the operational power setting. This may make use of a temperature sensor to provide active feedback for example.

The initial heat-up phase has a higher (initial) power setting to rapidly warm the light output surface 36 to the target temperature that is desired for operation. This improves convenience for a user who has to wait a shorter duration of time before using the shaver. However, this initial power setting may provide at the light output surface 36 an optical output which exceeds that which might be comfortable or safe for a user if maintained throughout an entire shaving session. Therefore, the second (operational) phase reduces the (time-average) power setting so that the temperature can be maintained, but the optical output is comfortable and safe for the user.

Figure 7:
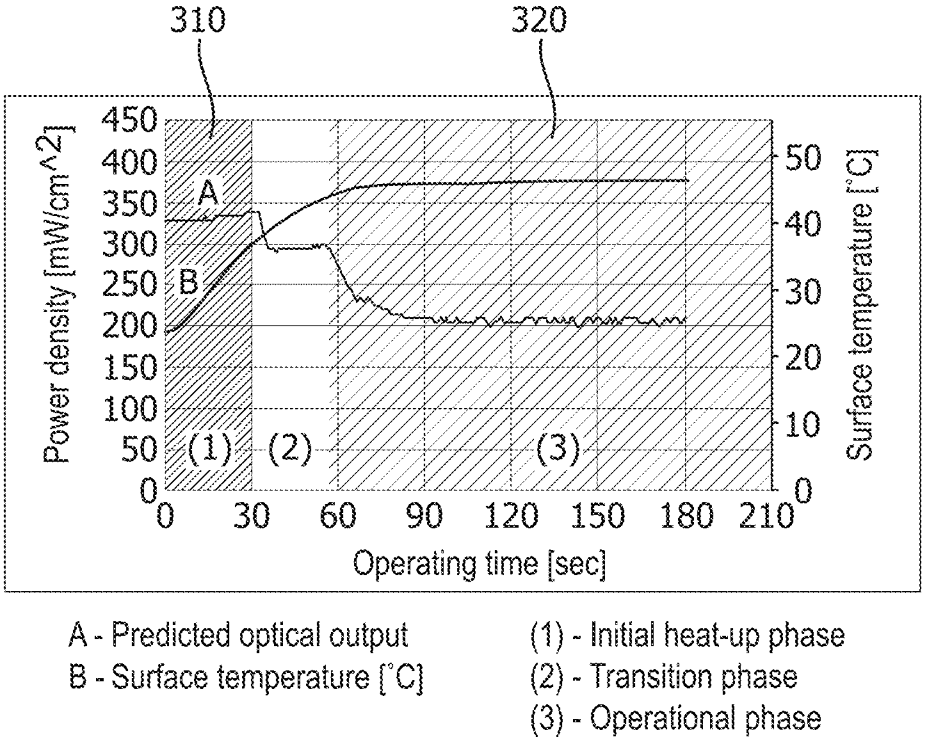
FIG. 7 illustrates example first and second operating phases of a lighting module in accordance with an aspect of the invention.

By way of further illustration, and without intending to limit the scope of the invention, an example of the first and second phases is schematically illustrated in the graph of FIG. 7. This shows the initial heat-up phase (1) and the subsequent operational phase (3), and a brief intermediary transition phase (2) separates them in time, during which the power setting is being reduced from the initial power setting to the lower operational power setting. FIG. 7 shows the optical power density at the light output surface (line A; units: $mW/cm^2$) during each operation mode, as well as the temperature (line B; units: ° C.) at the light output surface 36 during each mode, both as a function of time (units: seconds).

Figure 8:
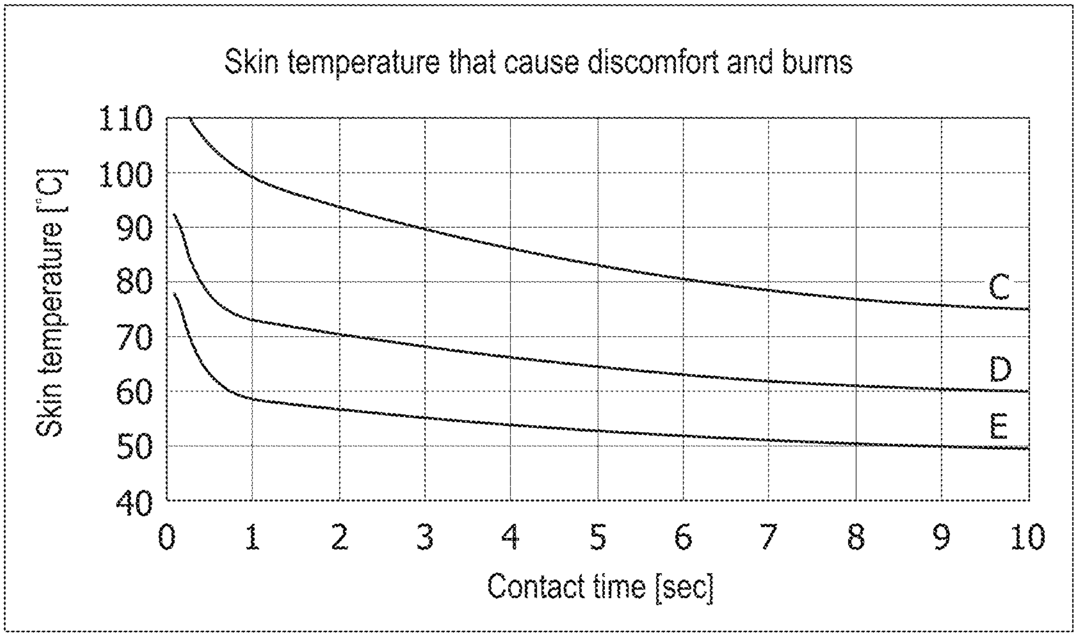
FIG. 8 illustrates skin temperature profiles corresponding to discomfort and injury of a subject.

With regard to the temperatures which should be targeted in the initial heat-up phase 310 and operational phase 320, these can be varied as desired, and are typically based on expected comfort and safety thresholds for users. FIG. 8 provides an exemplary summary of different applied skin temperature profiles (i.e. allowed maximum skin temperature as a function of contact time with the heat source) that cause discomfort and burns. Line C corresponds to a full skin thickness burn. Line D corresponds to a partial skin thickness burn. Line E corresponds to discomfort.

In at least one preferred set of embodiments, the predetermined temperature targeted by the initial heat-up phase and operational phase may be within a range from 40° C. to 50° C. More particularly, the predetermined temperature may be within a range from 41.8° C. to 42.2° C., within a range from 44.8° C. to 45.2° C., or within a range from 47.8° C. to 48.2° C. These temperature ranges are based on the following considerations.

Since the light output surface 36 contacts the skin during use, this temperature range targets a temperature within an expected comfort tolerance of a user. For example, normal facial temperature is around 36° C. (where this may vary depending upon environmental conditions). The perception sensitivity of the average person is around 2° C. Adding this 2° C. yields 38° C. in order for a heating effect to be sensible. Furthermore, taking into account that, for greatest sensorial benefit for the user, the temperature should be the maximal possible within safety and comfort limits, a suitable lowest boundary range may be between 42-43° C. This temperature has been found to be at a level which is still comfortable to a user, and which is effective in terms of providing skin benefits.

The upper boundary temperature may be selected both based on perception and preferences and also on compliance with safety standards. These indicate a maximum value of skin must be not higher than 48° C. For example, with reference to FIG. 8, it can be seen from line E that for an extended contact time of 10 seconds or more, a temperature of 48° C. is just below the lowest temperature which will cause discomfort to a user. Assuming a system has that has a temperature accuracy of 0.05° C., the upper temperature limit might be set at 47.95° C.

Since preferences of a user may differ regarding the temperature to target, the electric shaver in some embodiments may comprise an input member configured to enable selection of the predetermined temperature by a user of the electric shaver. An upper cap may be set on the temperature that can be selected, e.g. 48° C. in some examples, so that a user cannot exceed safety limits. The input member may be operatively coupled with the previously mentioned controller. There may be a plurality of pre-defined temperature settings from which the user may select. Alternatively, the controller and input member may permit a user to freely choose any target temperature within certain temperature boundaries.

By way of one illustrative example, a set of example pre-defined temperature settings for the target (predetermined) temperature which are selectable using the input member might be as follows:

TABLE 1

| Intensity Setting | Optical Power (W) | Thermal power (W) | Total power towards skin (W) | Surface Temperature (° C.) |
|---|---|---|---|---|
| Low | 0.37 | 0.97 | 1.34 | 43 |
| High | 0.58 | 1.40 | 1.985 | 48 |
| Optimum | 0.58 | 1.4 | 1.985 | 45 |

The initial heat-up phase 310 might be triggered automatically upon switch-on of the device. During the initial heat-up phase, the optical power is maintained fixed at a relatively high setting, and the temperature of the light output surface 36 rapidly rises. When the pre-determined target temperature is reached, the controller moves to the operational phase 320. Temperature feedback may be used to vary the optical output in the operational phase 320 so as to maintain the pre-determined target temperature steady (steady state phase).

In order to accelerate heat-up of the light output surface 36, the initial power setting during the initial heat-up phase 310 is set to be higher than the maximum power value used during the subsequent operational phase 320. By boosting power, the optical power density at the light output surface 36 is elevated, which thereby increases the rate of heat transfer to the light output surface 36. Accelerating heat-up must be balanced with comfort and safety as noted above. Further to managing the maximum temperature which is targeted, it is preferable to manage the maximum optical power density which is provided by the lighting elements 20 at the light output surface 36.

The aim in this regard may be to seek to limit a total optical energy density (in $J/cm^2$) which is delivered to any spot of a user's skin, over a continuous period of time, during use of the device so as to not exceed a pre-defined safety threshold. Continuous application of optical energy to any one spot on the skin means accumulated thermal exposure at that spot, which can lead to discomfort or burning if the total optical energy density delivered over the continuous exposure period is too high. The total optical energy density delivered to an area of user tissue over any continuous time window is a function of the time-average optical power density (in $W/cm^2$) delivered over said area (by a light output surface in contact with the area) and the time length of the time window. Since the length of time a user applies the light output surface to a single tissue spot cannot be directly controlled, it is advantageous to control the maximum optical power density provided at the light output surface over the initial heat-up phase in dependence on an assumed worse case user scenario relating to the period of time the user applies the light output surface to a single tissue area.

The optical power density across the light output surface may in general vary as a function of position on the light output surface. According to one or more embodiments, the heat-up phase may be configured such that, at a point or area of the light output surface where the optical power density has a maximum value during the initial heat up phase, said maximum value of the optical power density is between 325 $mW/cm^2$ and 360 $mW/cm^2$.

This is a safety constraint which is based on an assumption of a worst case user scenario, in which a user applies the light output surface to a single fixed spot on their tissue for 10 seconds. Research has shown that in normal use of any shaver, 10 seconds is the typical upper limit that a user will hold the shaver still on any one point before moving on. Therefore, an assumption of a maximum exposure time of 10 seconds is reasonable. Furthermore, this time limit could be enforced by making the duration of the initial heat-up phase 10 seconds (after which the operational phase triggers, reducing the optical power at the light output surface), so that it is not possible for the user to exceed a 10 second exposure time with the initial power setting. If the maximum optical power density at any spatial point/area across the light output surface is at the upper end of the above range, at 360 mW/cm$^2$, and the user applies the light output surface to a same static spot for the maximum 10 seconds, this would correspond to a total delivered optical energy density exposure to the tissue at said static spot of 3.6 J/cm$^2$. This ensures compliance with the IEC/EN 62471 standard safety regulations for "Photobiological Safety of Lamps and Lamp Systems" which mandate a maximal optical energy exposure of 3.6 J/cm$^2$.

Of course it is to be noted that the above stated range for the maximum optical power density is just one example implementation and is not intended to limit the inventive concept. For example, if different assumptions are made regarding user application times, and/or if regulatory constraints differ, the range could be altered. For example, the user might be given instructions regarding the maximum length of time that they should apply the shaver to any one spot (e.g. 5 seconds or 2.5 seconds), and an assumption made that the user follows these instructions. An automatically generated feedback prompt (e.g. auditory, or haptic) could be issued after any static hold of the device on one spot for a pre-determined length of time.

If this assumption is made, the maximum optical power density at the light output surface might be increased beyond the above stated 360 mW/cm$^2$. For example, if a continuous application time to the tissue is no longer than 5 seconds, then a maximum time-average optical power density at the light output surface during the initial heal-up phase may be set at up to 600 mW/cm$^2$. If the assumed maximum exposure time is even lower, at 2.5 seconds, the maximum optical power density could be even further increased to 1 W/cm$^2$. The initial heat-up period could be set to have a length equal to these maximum time periods, although these may not be long enough to achieve the desired target surface temperatures.

It is a design choice to what extent a user is trusted to not exceed the expected maximum exposure time on one spot. For balancing on the side of safety, the 10 second assumed exposure time (which is in accordance with natural behavior patterns of users) may be preferred. In this way, the temperature of the skin can be controlled to remain under the pre-defined maximum temperature (e.g. 48° C.), and the optical energy exposure can be kept below the 3.6 J/cm$^2$, in accordance to the IEC/EN 62471 standard safety regulations.

The lighting module typically may comprise a spatial arrangement of IR or NIR lighting elements 62, wherein an irradiance (optical power per unit area) provided at the light output surface differs for different of the lighting elements 62. The irradiance may differ in this regard due to a differing optical path length between different respective IR or NIR lighting elements 62 and the light output surface.

In view of the above, according to one or more embodiments, the lighting module may be configured such that a light beam of at least one of the IR or NIR lighting elements 62 has, during the initial heat-up phase, a highest average optical power density at the light output surface compared with the other IR or NIR lighting elements, wherein the power value of the initial power setting is such that said highest average optical power density is between 325 mW/cm$^2$ and 360 mW/cm$^2$. The average optical power density provided by the light beam of a given lighting element at the light output surface means the average value of the optical power density measured in a cross-section of the light beam at the light output surface during the initial heat-up phase. Here it is assumed that the light beams of the different IR or NIR lighting elements do not overlap at the light output surface. Thus, depending on their positions in the lighting module 14, one or more of the IR or NIR lighting elements will provide a highest average optical power density at the light output surface. The initial power setting needs to be such that this highest average optical power density is between 325 mW/cm$^2$ and 360 mW/cm$^2$. In embodiments where the lighting elements provide overlapping light beams at the light output surface, the initial power setting during the initial heat-up phase should e.g. be such that a highest optical power density at any position on the light output window is within the aforementioned range of optical power densities.

The optical power density provided by a given lighting element 62 will depend upon the power of the source powering the lighting element, and also upon the optical path length from the lighting element to the light output surface.

Figure 9:
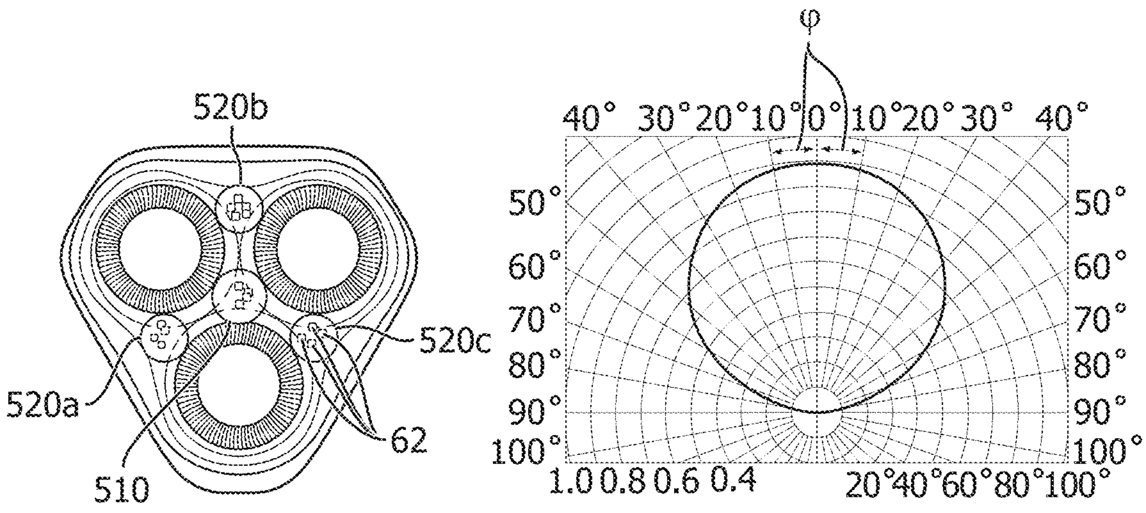
FIG. 9 shows an example optical output profile provided by an exemplary spatial arrangement of lighting elements in a lighting module according to at least one embodiment of the invention.

For example, reference is made to FIG. 9, which shows (left) an example positioning of IR/NIR lighting elements 62 for an example shaving unit 10 relative to the light output surface 36. The lighting elements 62 are arranged into a plurality (in this case four) spatial groups or clusters. Each group may contain at minimum one IR/NIR lighting element 62, but may contain more than one IR/NIR lighting element. The lighting element groups include a central group 510, and a first 520*a*, second 520*b*, and third 520*c* peripheral group. The radiation pattern for a typical IR/NIR LED lighting element 62 is shown in FIG. 9 (right). This shows that the typical radiation maximal angular extent is 60 degrees on each side of the normal optical axis of the LED.

In view of this, it can be determined that the central group 510 of one or more IR/NIR lighting elements 62 has a larger irradiance area at the light output surface, has the best contact with the skin, but has a lower average irradiance level <300 mW/cm^2 due to a greater distance between the IR/NIR lighting elements in comparison with the peripheral groups of IR/NIR lighting elements. The greater distance between the central group 510 and the light output surface is due to a slight convex curvature of the lighting module housing 18, with the apex of the convex curvature coinciding with the location of the central group of lighting elements.

In this example, in the area in-between the four groups of IR/NIR lighting elements 62 (the area between the blue circles), the skin contact surface is substantially free of irradiance from the IR/NIR lighting elements, and therefore this area will be exposed only to conductive heating.

Options for control of the lighting elements 20 for implementing the initial heat-up phase 310 and the operational phase 320 will now be discussed in more detail.

With regards to control of the lighting module 14, activation of the lighting module 14 may be triggered by activation of the one or more hair-cutting units 12. For example, activation of the initial heat-up phase may be triggered by activation of the one or more hair cutting units (i.e. switch-on of the electric shaver). This simultaneous activation may be achieved through simultaneous control by the previously mentioned controller of the electric shaver 100, or it may be triggered automatically due to a parallel wiring arrangement between the cutting units 12 and the lighting module 14.

In addition to, or instead of, this control configuration, the electric shaver 100 may comprise a further input member (e.g. a switch or other input device) configured to enable a user of the electric shaver to activate and/or deactivate the lighting module 14 independently from activation of the one or more hair-cutting units 12. This allows a user to choose to use the hair-cutting function of the shaver with or without the heating function. The electric shaver controller might have a default setting that the lighting module is triggered with activation of the hair-cutting units, but wherein a user can deactivate the lighting module using the further input member.

With regards to the targeting of the previously mentioned pre-determined temperature, in one or both of the initial heat-up phase and the operational phase, use may be made of a temperature sensor 350 to provide temperature feedback to the controller. The temperature sensor may be carried on the same PCB 38 which carries the lighting elements 20. For example, the temperature sensor 350 may be mounted to the previously discussed first main surface 42 of the PCB in a position immediately adjacent to one of the lighting elements, e.g. one of the IR or NIR lighting elements. The temperature sensor 350 can be seen for example in the cross-sectional view of FIG. 5. Providing the temperature sensor directly adjacent the lighting elements provides optimal thermal coupling between the two.

A thermally conductive pathway between said the first main surface 42 of the PCB facing the light output surface 36 and the light output surface 36 may optionally be provided by the previously described optional optically transmissive potting material 40, provided to cover the first main surface 42 of the PCB 38, thereby encapsulating the lighting elements 20 and the temperature sensor 350. The potting material also provides thermal coupling of the aforementioned temperature sensor 350 and the light output surface 34, thereby increasing the accuracy of the temperature sensor in measuring the surface temperature.

Figure 10:
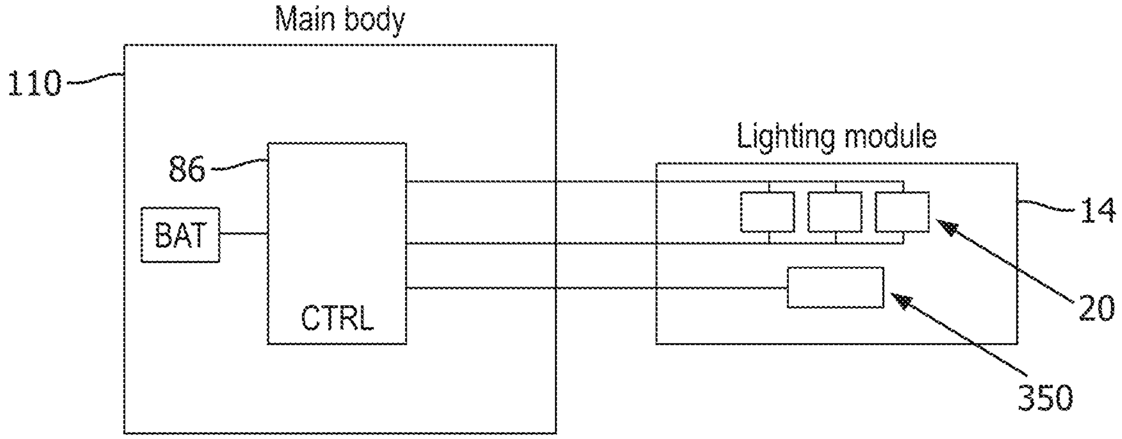
FIG. 10 shows an example drive circuit for controlling a lighting module using sensor feedback from a temperature sensor.

A portion of one example control circuit is schematically shown in FIG. 10. This circuit includes circuit components in the lighting module 14 (in the shaving unit 10) and also in the main body 110 of the shaver. In this example, the lighting module comprises the lighting elements 20 and further comprises a temperature sensor 350 (e.g. a thermistor), The main body 110 comprises a controller 86. The controller 86 is configured to control a duration of the initial heat-up phase. The controller is further adapted to control, in the operational phase, a power level of the lighting elements 20 in dependence upon a sensing output from the temperature sensor 350. For example, the controller is configured in this way to regulate a temperature of the light output surface 36 in dependence upon an output from the temperature sensor, via control of the lighting elements 20.

The main body circuit in the illustrated example further comprises a battery ("BAT") for powering the lighting module 14, an electrical connection to the lighting module for powering the lighting module and a signal connection to the lighting module for receiving sensing signals from the temperature sensor 350.

Controlling a power level of the lighting elements may comprise changing a duty cycle frequency of a pulse wave modulation (PWM) drive scheme.

To control the lighting module to maintain a desired set-point temperature, the lighting module comprises a temperature sensor 350, e.g. a thermistor, e.g. a negative temperature coefficient (NTC) thermistor.

The controller 86 is able to sample the temperature sensor 350 signal and this can be processed by the controller 86 to convert the sensor signal into a temperature. Since temperature changes tend to be slow, the sampling frequency of the temperature sensor is not critical.

The obtained temperature value may be used in a closed loop system to regulate the desired set-point temperature.

Safeguards may be incorporated to avoid overheating. For example, if the measured signal is outside a certain operating bandwidth (indicating overheat), the lighting module might be automatically deactivated.

Various temperature control module options are possible. According to one particular example, the controller 86 may comprise a feedback control loop comprising the temperature sensor 350 and a proportional-integral (PI) control member.

Regulation of the temperature of the shaving unit may be achieved based directly on the temperature readings of the temperature sensor 350. Alternatively, the controller may be adapted to determine a corrected temperature of the light output surface using the output from the temperature sensor and a temperature correction function which is applied to the output from the temperature sensor, and to control a power level of the lighting elements in dependence upon the corrected temperature of the light output surface. Here, the corrected temperature may for example be an estimated temperature at the skin contact surface which may be different from the direct temperature measured by the temperature sensor. For example, the corrected temperature might be computed using a temperature calculation function which is applied to the temperature output from the temperature sensor.

According to a set of further embodiments, there may be provided a novel optical arrangement in the shaving unit 10 for modulating a visible light profile provided at the light output surface 36 by means of the one or more visible lighting elements 64. The shaving unit 10 in this example may be the same or similar to that described above in relation to earlier embodiments. In particular, all features of any of the above-described electric shavers 100 and shaving units 10 are compatible with this set of further embodiments of the invention, but some may be omitted. For example, the potting material described earlier is not essential.

By way of introduction to this set of further embodiments, it is noted that it is advantageous to include visible lighting elements 64 among the plurality of lighting elements 20 whose primary function is provide a source of visible light for providing a user a visible indicator of activation of the heating function of the lighting module 14. The lighting elements for heating generate a light output in the non-visible spectrum, meaning that no visual feedback is provided to a user. By the integration of optical feedback in the visible domain at the location of the light output surface 36, a user is able to identify a status of operation.

Figure 11:
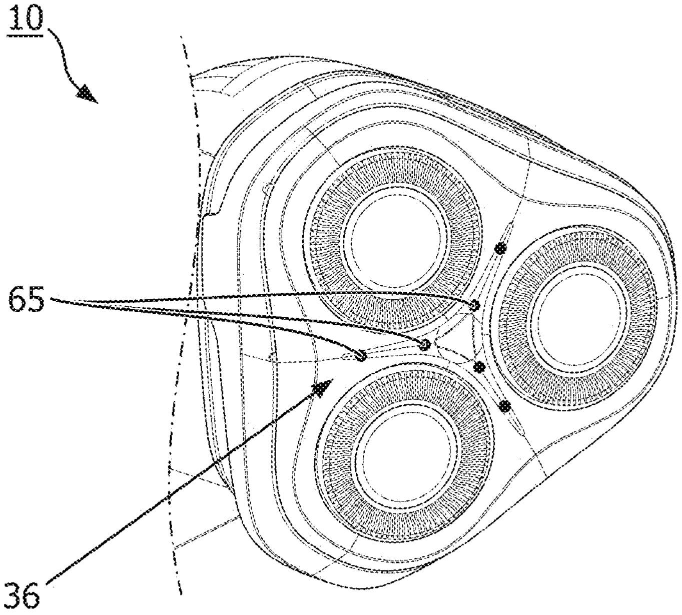
FIG. 11 illustrates an undesirable visible light output of a lighting module in an electric shaver provided in the absence of an optical arrangement for modifying a visible light profile.
Figure 12:
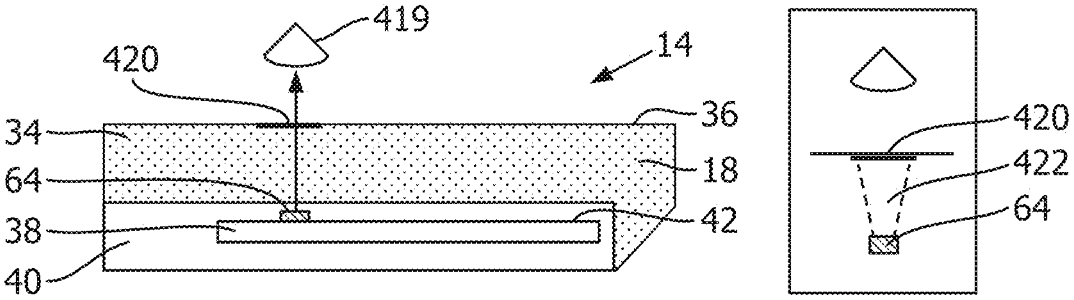
FIG. 12 shows an example lighting module in an electric shaver in the absence of an optical arrangement for modifying a visible light profile.

An aim of at least one set of embodiments of this invention is the integration of light processing elements into the shaving unit 10 to modify what would otherwise appear at the light output surface 36 as isolated point source light spots. This is illustrated schematically by FIG. 11 which illustrates example visible light profiles 65 generated by visible lighting elements at the light output surface 36 if no optical arrangement is provided in the lighting module. FIG. 12 shows a cross-section through such a lighting module 14 in which there is no optical arrangement for guiding visible light. A forward-directed visible lighting element 64 is shown mounted on the first (upper) main surface 42 of a PCB 38. The light output surface 36 can be understood as comprising a proximate area 420, corresponding to an area of an imaginary projection 422 of the visible lighting element 64 onto the light output surface, as illustrated in FIG. 12. For each individual lighting element, this proximate area 420 is relatively small, meaning that the visible light generated by each visible lighting element 64 appears to an observer 419 as a point source on the light output surface 36. However, this does not represent the fact that the actual heat treatment is spread across a wider surface area of the light output surface 36.

Thus, according to one or more embodiments, the lighting module 14 is further provided with an optical arrangement for creating a visible light output provided by the visible lighting elements 64 at the light output surface 36.

Figure 13:
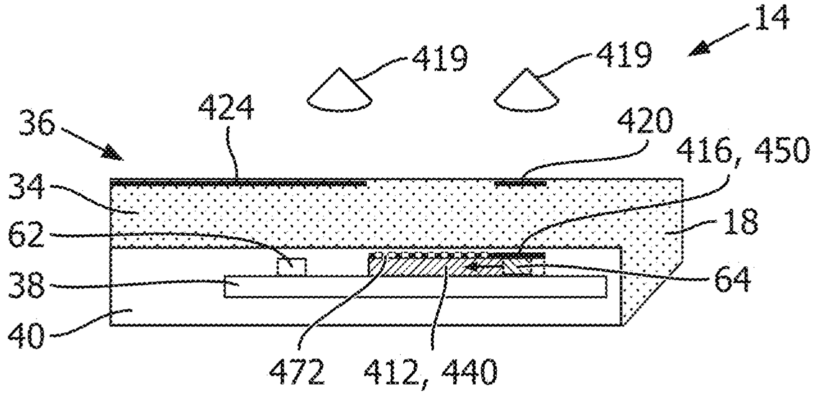
FIGS. 13-15 illustrate in cross-section an example lighting module in a shaving unit according to the invention having an optical arrangement for providing light guiding of a visible light output.
Figure 14:
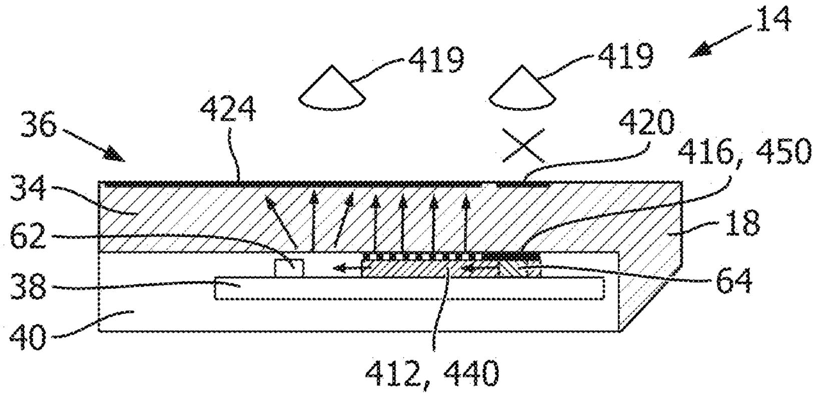
Figure 15:
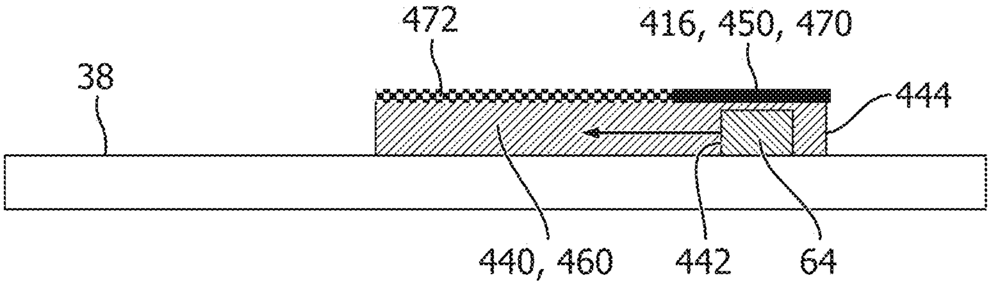

One example is schematically illustrated in FIGS. 13 to 15 and this will now be described.

A shaving unit 10 is provided which comprises a lighting module 14 having one or more infrared (IR) or near-infrared (NIR) lighting elements 62 and one or more visible lighting elements 64 for generating visible light. Only one visible lighting element 64 is shown in FIGS. 13-15, but multiple such elements may be provided in further examples. Both the IR or NIR lighting elements 62 and the visible lighting elements 64 are arranged in optical communication with the light output surface 36. The visible lighting elements 64 are configured and arranged for being activated together with activation of the IR or NIR lighting elements 62 for providing a visible indication of the activation of the IR or NIR lighting elements 62. The activation of the IR or NIR lighting elements 62 and the visible lighting elements 64 may be controlled for example by a controller.

As mentioned previously, the light output surface 36 may be understood as comprising one or more proximate areas 420, each comprising an area of an imaginary projection 422 of a respective one of the visible lighting elements 64 onto the light output surface 36. The optical arrangement comprises a light guiding arrangement 412 configured to guide the visible light generated by the visible lighting elements 64 at least to a main area 424 of the light output surface, where the main area excludes the one or more proximate areas 420 of the light output surface 36.

The optical arrangement further comprises one or more light attenuating elements 416, each being arranged between a respective one of the visible lighting elements 64 and the proximate area 420 of the light output surface 36 associated with said respective one of the visible lighting elements 64, and each having a transmissivity for the visible light smaller than a transmissivity for the visible light of the light guiding arrangement 412. In the illustrated example of FIG. 13 to FIG. 15, the one or more light attenuating elements 416 each comprise a layer of a light-attenuating material 450, which may be partially light attenuating (i.e. translucent) or fully light attenuating, i.e. opaque. In the illustrated example, the layer of light attenuating material 450 is deposited on a portion of an otherwise light-transmissive (e.g. optically transparent) carrying sheet 472 which extends atop the light-guiding member 440 and the visible lighting elements 64. In other examples, the light attenuating elements 416 may each be formed by an integral portion of the carrying sheet 472, for example as a light attenuating (e.g. tinted) section of an otherwise optically transparent sheet.

The carrying sheet 472 may be optically transparent. However, in other examples the carrying sheet may be optically transmissive and at the same time optically diffusive or scattering for the purpose of facilitating a more homogenous distribution of light across the main area 424 of the light output surface.

FIG. 14 schematically illustrates the modified visible light profile provided to the light output surface as a consequence of the light guiding arrangement 412. The light attenuating elements 416 inhibit a direct optical path from each visible lighting element 64 to the light output surface 36, i.e. to the proximal area 420 of the light output surface 36 associated with the visible lighting element 64.

In the example of FIG. 13 to FIG. 15, the light guiding arrangement 412 comprises a light guiding member 440 arranged to guide the visible light generated by the visible lighting elements 64 in a guiding direction having a main directional component parallel to the light output surface 36. The one or more visible lighting elements 64 may each comprise for example a side-view LED arranged to introduce the visible light into the light guiding member 440 via an edge surface 442 of the light guiding member 440.

The light guiding member 440 may comprise light outcoupling elements configured for coupling the visible light out of the light guiding member 440 in a direction towards the light output surface 36. For example, the guiding member may comprise an array of inclined light-guiding facets for reflecting or scattering light outward from the light guiding member (not shown in FIG. 13-16, but visible for example in FIG. 17).

FIG. 15 shows a closer cross-sectional view of the PCB 38 arrangement of the embodiment of FIG. 14.

Figure 16:
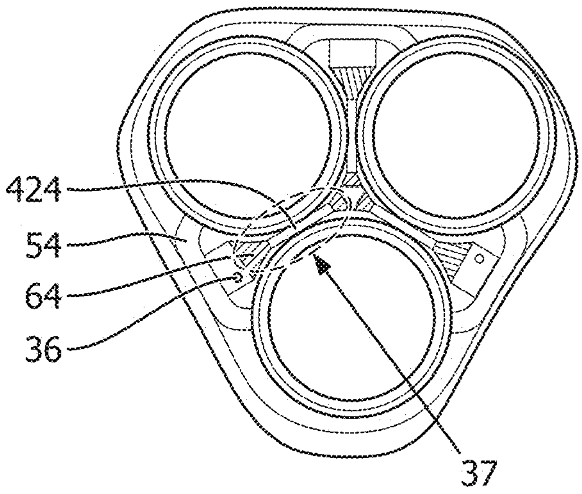
FIG. 16 shows a modified visible light profile provided at the light output surface of the lighting module in accordance with one or more embodiments of the invention.

FIG. 16 shows a view of the skin contacting surface 54 of the shaving unit 10, which in this case is formed by an upper wall 34 of the housing 18 of the lighting module 14. FIG. 16 shows the light output surface 36 which may form at least a part of the skin contacting surface 54. FIG. 16 shows the spatially extended visible light output which is achieved by virtue of the optical arrangement discussed above and illustrated in FIGS. 13-15. As indicated, this corresponds to the main area 424 of the light output surface shown in FIG. 14, to which the visible light of the visible lighting elements 64 is guided by the light guiding arrangement 412 of the lighting module 14.

The spatial location of the particular visible lighting element 64 illustrated in FIG. 13 to FIG. 15 is indicated in FIG. 16.

Figure 17:
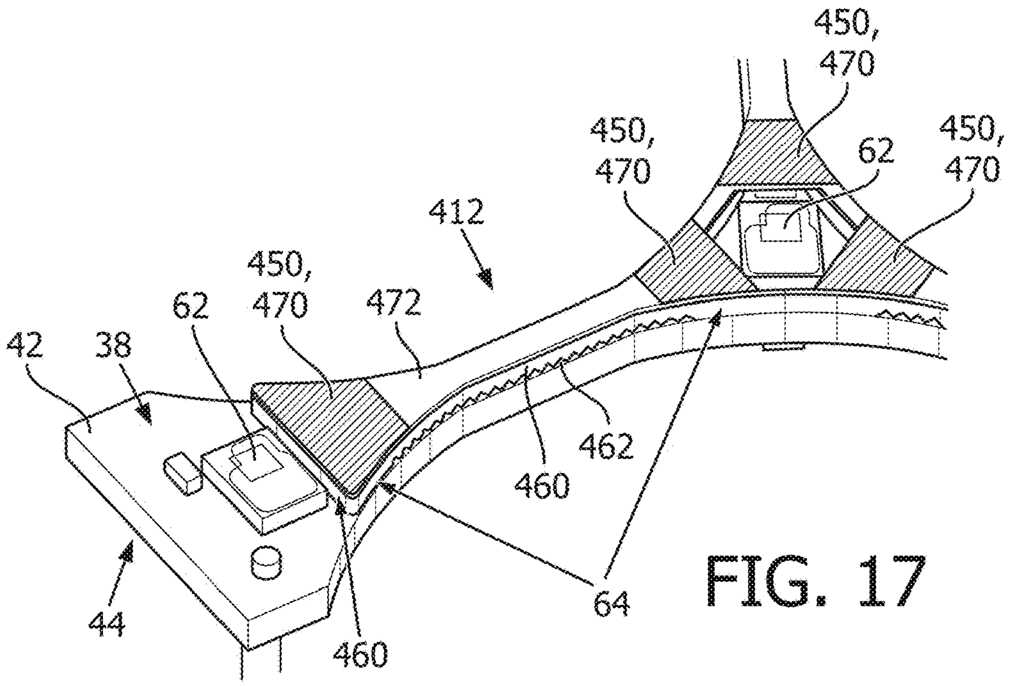
FIG. 17 shows a perspective view of a portion of an optical arrangement in a lighting module in accordance with one or more embodiments of the invention.

FIG. 17 shows a perspective view of the PCB 38, lighting elements and optical arrangement of the lighting module of FIGS. 13-15. The visible lighting elements 64 are mounted to the first main surface 42 of the PCB, which first main surface is arranged facing the light output surface 36 (not shown in FIG. 17) when assembled. The visible lighting elements 64 are not directly visible in FIG. 17 since they are mounted beneath respective layers of opaque material 450, hiding them from view.

In the illustrated example, each visible lighting element 64 is a side-emitting visible lighting element. The light guiding arrangement 412 is shown in FIG. 17. The light guiding arrangement comprises a light guiding member in the form of a light guiding sheet 460, the light guiding sheet 460 being arranged on the first main surface 42 of the PCB. The layers of light attenuating material 450, which each form a light attenuating element. are provided by disposing an optically transparent carrying sheet 472 over the light guiding sheet 460, wherein each light attenuating element is provided as an opaque masking ink layer 470 on a respective area of the optically transparent carrying sheet 472 which lies in a direct optical path between a respective one of the visible lighting elements 64 and the light output surface, for example on a region directly above each respective visible lighting element 64.

Although in this example, the layers of light attenuating material 450 are provided in the form of opaque ink layers, other options are possible. Instead of opaque ink layers, partially light-attenuating masking layers may be provided. These may be facilitated by partially light attenuating ink, or by a different material. They may be facilitated by adhesive layers (e.g. stickers) adhered over relevant sections of the carrying sheet 472. These may in some examples be provided with a color tint, for example red.

Furthermore, as mentioned above, although in the described example, the carrying sheet 472 is optically transparent, the carrying sheet in other examples may be an optically transmissive light diffusing sheet, to improve homogeneity of the visible light profile provided at the light output surface.

In the example of FIGS. 13-17, the light guiding member is a light guiding sheet 460 which is optically configured to provide a light scattering or diffusing effect so as to spread the visible light output from the visible lighting element(s) 64 across a wider visible area of the light output surface 36 of the lighting module 14. The visible lighting elements 64 may be side-directed visible lighting elements, wherein the light guiding sheet 460 receives and guides the visible light generated by the visible lighting elements 64 in a guiding direction having a main directional component parallel to the light output surface 36 of the lighting module 14. The visible lighting element 64 may for example be received within a cavity or opening or notch formed into a side-wall 444 of the light guiding member, and wherein the light from the visible lighting element 64 is introduced into the light guiding member 440 via an edge surface 442 within this cavity within the light guiding member 440.

The light guiding sheet 460 comprises light outcoupling elements 462 configured for coupling the visible light out of the light guiding member in a direction towards the light output surface. In the example of FIG. 17, the light guiding sheet 460 is structured to include in particular a linear array of inclined planar facets 462 which act to scatter the light and to outcouple it from the light guide sheet 460 in the direction of the light output surface 36 above the PCB 38.

The visible lighting elements 64 are provided on the same PCB 38 as the IR or NIR lighting elements 62.

Figure 18:
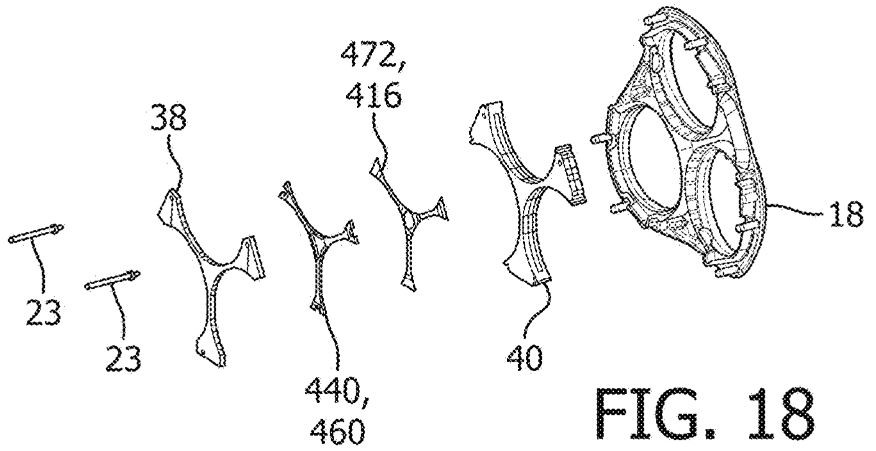
FIG. 18 shows an exploded view of an example shaving unit comprising an optical arrangement in accordance with the invention.

FIG. 18 shows an exploded view of the example lighting module 14 of FIGS. 13-17. The light output surface 36 of the lighting module housing 18 forms a skin contact surface for the shaving unit. Within the lighting module housing 18 is received a layered stack comprising: the PCB 38 carrying the IR/NIR lighting elements 62 and the visible lighting elements 64 mounted to the first main surface 42 thereof, a light guiding sheet 460 mounted on the first main surface 42 of the PCB 38 (e.g. via an adhesive), and an optically transparent carrying sheet 472 to which are deposited opaque ink layers 470 that each form a light attenuating element 416. This layered stack is encapsulated within the lighting module housing 18 by a potting material 40, as described previously. FIG. 18 also shows electrical connection pins 23 that are provided on the second main surface 44 of the PCB 38 for connection of the lighting elements 62, 64 to a power source in the main body of the shaver. FIG. 18 does not show the layer of the potting material provided at the second main surface 44 of the PCB 38.

In the example of FIG. 17, both the visible lighting elements 64 and the IR or NIR lighting elements 62 are mounted on the first main surface 42 of the PCB 38 facing the light output surface 36. However, in an alternative set of embodiments, the IR or NIR lighting elements 62 may be mounted on the first main surface 42, and the visible lighting elements 64 may be mounted on the second main surface 44 of the PCB opposite to the first main surface 42 or both on the first and second main surfaces 42, 44 of the PCB 38. In this example, portions of the PCB 38 itself act as light attenuating elements 416 for the visible lighting elements 64 that are mounted on the second main surface 44 of the PCB 38, inhibiting a direct optical path between the visible lighting elements 64 on the second main surface 44 and the light output surface 36.

Figure 19:
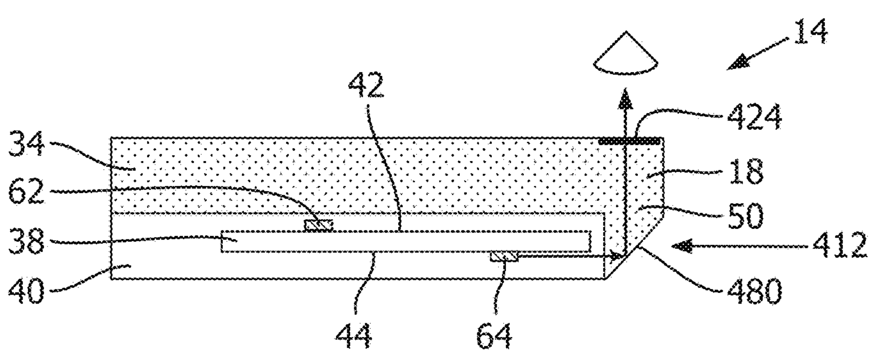
FIG. 19 shows a further embodiment of a lighting module having an optical arrangement integrally formed by a housing of the lighting module.

An example is schematically illustrated in FIG. 19. The visible lighting elements 64 are mounted on the second main surface 44 of the PCB 38. The previously mentioned one or more light attenuating elements may be understood as each being formed by a respective portion of the PCB 38 on which the respective one of the visible lighting elements 64 is arranged.

Figure 20:
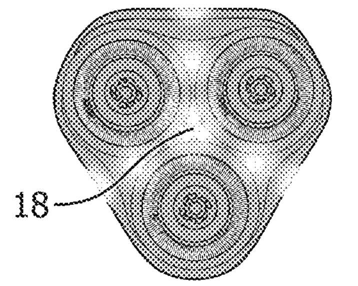
FIG. 20 shows an example visible light output provided by the lighting module of FIG. 19.

The light guiding arrangement 412 in this case comprises light guiding and/or light reflecting portions 480 of a housing 18 of the lighting module 14. Thus in this case, the lighting module housing 18 itself forms at least part of the light guiding arrangement. As shown in FIG. 19, an internal surface 480 of the lighting module housing 18 may be arranged to guide and/or reflect the visible light generated by the visible lighting elements 64 on the second main surface 44 of the PCB 38 towards the light output surface 36. Furthermore, the housing 18 of the lighting module 14 may be integrally made from the same optically transmissive material which forms the light output surface 36, and an upper wall 34 of the housing 18 and side walls 50 of the housing 18 may comprise the light guiding and/or reflecting portions of the housing 18 of the lighting module 14. In other words, the body of the lighting module housing 18 may be adapted to receive the visible light emitted by the visible lighting elements 64 on the second main surface 44 of the PCB 38 and to couple the visible light to the light output surface 36. In some examples, the body of the lighting module housing 18 is adapted to apply a scattering effect to the visible light, to thereby spread the visible light through the body of the lighting module housing 18. This is known as volume scattering and has the effect of providing a diffuse visible light illumination of the whole of the upper wall 34 of the lighting module housing 18, for example as illustrated in FIG. 20.

In some examples, the light guiding and/or light reflecting portions 480 of the housing 18 of the lighting module 14 are arranged to co-operate with further light guiding and/or light reflecting portions of the hair-cutting units 12 and/or the supporting member 22 (see FIGS. 1-3) for guiding and/or reflecting the visible light generated by the visible lighting elements 64 on the second main surface 44 of the PCB 38 towards the light output surface 36.

For example, visible light reflecting elements or reflecting surfaces/interfaces might be formed in the body of the lighting module housing 18 and/or the body of the supporting member 22. The reflecting surfaces might be configured so as to provide a Total Internal Reflection (TIR) effect. Reflecting and/or scattering elements may be provided within or around the one or more hair cutting units 12, these being arranged to receive at least a portion of the visible light output of the visible lighting elements 64.

Although in the example of FIG. 19, the visible lighting element 64 is mounted on the second main surface 44 of the PCB 38, the use of a lighting module housing 18 formed of a light transmissive material for volume scattering of visible light is compatible also with visible lighting elements mounted on the first main surface 42 of the PCB.

Figure 21:
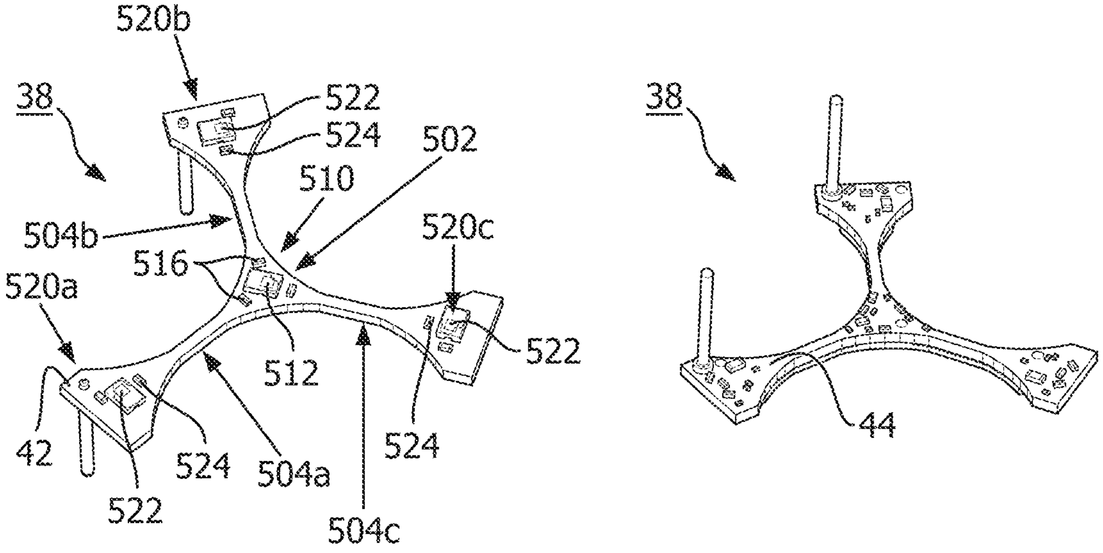
FIG. 21 shows a PCB portion of an example lighting module according to the invention.

FIG. 21 shows a further perspective view of the first main surface 42 (upper side) and second main surface 44 (underside) of the PCB 38 of the example illustrated in FIGS. 13-18.

The PCB 38 comprises a central region 502 outward from which extend a plurality (in this case three) elongate arms 504*a*, 504*b*, 504*c*, each arm of the PCB 38 having a smaller width stem section connected to the central region and a wider width end section. Each wider width end section carries one or more IR or NIR lighting elements and at least one visible lighting element. These may be referred to as first 520*a*, second 520*b* and third 520*c* peripheral groups of lighting elements. The central region also carries one or more IR or NIR lighting elements and at least one visible lighting element, and these collectively may be referred to as a central group 510 of lighting elements. At least one temperature sensor may be provided on the PCB. The stem sections of the arms of the PCB may be free from electrical components. When assembled, these may carry the light guiding member 440, for example the light guiding sheet 460.

Figure 22:
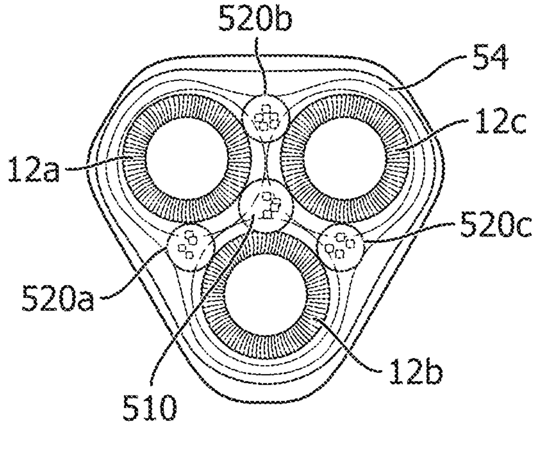
FIG. 22 shows positioning of the lighting elements of the lighting module of FIG. 21 relative to the light output surface of the lighting module.

When assembled, and as schematically illustrated by FIG. 22, the central group 510 of lighting elements may be arranged in a central area of the shaving unit 10 between a first 12*a*, second 12*b* and third 12*c* hair-cutting unit and may comprise a central IR or NIR lighting element 512 and at least three central visible lighting elements 516.

The lighting module further comprises a first 520*a*, a second 520*b* and a third 520*c* peripheral group of lighting elements arranged in, respectively, a first, a second and a third peripheral area of the shaving unit 10 between, respectively, the first 12*a* and the second 12*b* hair-cutting unit, the first 12*a* and the third 12*c* hair-cutting unit, and the second 12*b* and the third 12*c* hair-cutting unit, and each comprising a peripheral IR or NIR lighting element 522 and at least one peripheral visible lighting element 524.

Figure 23:
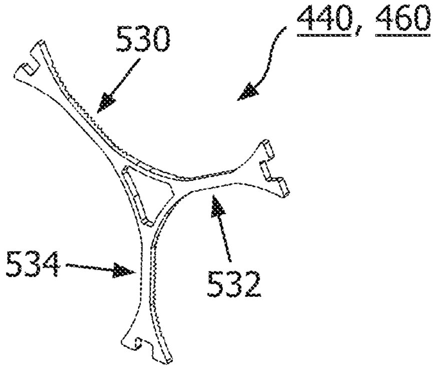
FIG. 23 shows an example light guiding member of the lighting module of FIG. 21.

FIG. 23 shows a view of the light guiding member 440 in the form of a light guiding sheet 460 previously shown in FIGS. 13-18, for being mounted on the PCB 38 of FIG. 21. The light guiding member 440 has a multi-arm geometry corresponding to that the geometry of the PCB 38. It in particular comprises a first portion 530, second portion 532 and third portion 534. The first portion, when assembled, is extending between a first one of the central visible lighting elements 516 and the at least one peripheral visible lighting element 524 of the first peripheral group 520*a* of lighting elements. The second portion 532 is extending between a second one of the central visible lighting elements 516 and the at least one peripheral visible lighting element 524 of the second peripheral group 520*b* of lighting elements. The third portion 534 is extending between a third one of the central visible lighting elements 516 and the at least one peripheral visible lighting element 524 of the third peripheral group 520*c* of lighting elements. The lighting module further comprises light attenuating elements for the central visible lighting elements 516 and for the peripheral visible lighting elements 524 (not shown in the FIGS. 21-23) provided in a similar way as explained here before in connection with the embodiments of the FIGS. 12-18.

As discussed above, the invention makes use of a controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Variations to the disclosed embodiments can be understood and effected by those skilled in the art in practicing the claimed invention, from a study of the drawings, the disclosure and the appended claims. In the claims, the word “comprising” does not exclude other elements or steps, and the indefinite article “a” or “an” does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term “adapted to” is used in the claims or description, it is noted the term “adapted to” is intended to be equivalent to the term “configured to”.

Any reference signs in the claims should not be construed as limiting the scope.

| Reference Numerals | |
|---|---|
| shaving unit (10) | initial heat-up phase (310) |
| electric shaver (100) | operational phase (320) |
| hair-cutting units (12) | PI control member (334). |
| lighting module (14) | temperature sensor (350) |
| lighting module housing (18) | |
| lighting elements (20) | light guiding arrangement (412) |
| supporting member (22) | light attenuating elements (416) |
| contact pin (23) | output surface proximate area (420) |
| cavity (32) | imaginary projection (422) |

-continued

| Reference Numerals | |
|---|---|
| lighting module upper wall (34) | output surface main area (424) |
| light output surface (36) | light guiding member (440) |
| PCB (38) | layer of a light attenuating material (450) |
| potting material (40) | light guiding sheet (460) |
| potting material layer (41a) | opaque ink layer (470) |
| potting material further layer (41b) | optically transparent carrying sheet (472) |
| PCB first main surface (42) | light guiding/reflecting portions (480) |
| PCB second main surface (44) | |
| PCB edge surface (46) | central group of lighting elements (510) |
| housing side walls (50) | central IR or NIR lighting element (512) |
| skin-contacting surface (54) | central visible lighting elements (516); |
| openings (56) | first peripheral group (520a) |
| IR or NIR lighting element (62) | second peripheral group (520b) |
| visible lighting element (64) | third peripheral group (520c) |
| internal surface of upper wall (72) | peripheral IR/NIR lighting element (522) |
| shaver main body (110) | peripheral visible lighting element (524) |
| external cutting member (120) | light guiding member first portion (530) |
| hair-entry openings (122) | light guiding member second portion (532) |
| controller (86) | light guiding member third portion (534) |

The invention claimed is:

1. An electric shaver comprising a shaving unit and a controller, wherein the shaving unit comprises:

one or more hair-cutting units;

a lighting module comprising one or more lighting elements and a skin-facing light output surface via which light generated by the lighting elements is exposed to skin during operation of the shaving unit, said light output surface being made from an optically transmissive material and being arranged for contacting the skin during operation of the shaving unit, and said lighting elements being arranged in thermally conductive contact with the light output surface via a thermally conductive pathway in the lighting module; and a supporting member supporting the one or more hair-cutting units and the lighting module; and wherein the controller is operatively coupled with the lighting module and adapted to control the lighting elements in two phases:

an initial heat-up phase, triggered upon activation of the lighting module, in which the lighting elements are provided with an initial power setting until a predetermined temperature of the light output surface is reached; and an operational phase following the initial heat-up phase, in which the lighting elements are provided with an operational power setting such that the temperature of the light output surface is controlled to be maintained at the predetermined temperature; and wherein a maximum power value of the operational power setting is lower than a power value of the initial power setting.

2. The electric shaver as claimed in claim 1, wherein the predetermined temperature is within a range from 40° C. to 50° C.

3. The electric shaver as claimed in claim 2, wherein the predetermined temperature is within a range from 41,8° C. to 42,2° C., within a range from 44,8° C. to 45,2° C., or within a range from 47,8° C. to 48,2° C.

4. The electric shaver as claimed in claim 1, wherein the electric shaver comprises an input member configured to enable selection of the predetermined temperature by a user of the electric shaver.

5. The electric shaver as claimed in claim 1, wherein the one or more lighting elements comprise one or more LEDs.

6. The electric shaver as claimed in claim 1, wherein the one or more lighting elements comprise an infrared or near infrared lighting element.

7. The electric shaver as claimed in claim 1, wherein a light beam of at least one of the lighting elements has, during the initial heat-up phase, a highest average optical power density at the light output surface compared with the other lighting elements, and wherein the power value of the initial power setting is such that said highest average optical power density is between 325 $mW/cm^2$ and 360 $mW/cm^2$.

8. The electric shaver as claimed in claim 1, wherein the activation of the lighting module is triggered by activation of the one or more hair-cutting units.

9. The electric shaver as claimed in claim 1, wherein the electric shaver comprises a further input member configured to enable a user of the electric shaver to activate and/or deactivate the lighting module independently from activation of the one or more hair-cutting units.

10. The electric shaver as claimed in claim 1, wherein the electric shaver further comprises a temperature sensor, and wherein the controller is configured to control a duration of the initial heat-up phase and, in the operational phase, the temperature of the light output surface in dependence on an output from the temperature sensor.

11. The electric shaver as claimed in claim 10, wherein the controller comprises a feedback control loop comprising the temperature sensor and a proportional-integral control member.

12. The electric shaver as claimed in claim 10, wherein the lighting module comprises a printed circuit board (PCB), wherein the lighting elements are mounted to a first main surface of the PCB facing the light output surface such that the lighting elements are in optical communication with the light output surface during operation of the lighting module, and wherein the temperature sensor is mounted to said main surface of the PCB in a position immediately adjacent to one of the lighting elements.

13. The electric shaver as claimed in claim 12, wherein the thermally conductive pathway comprises an optically transmissive potting material that covers the main surface of the PCB thereby encapsulating the lighting elements and the temperature sensor.

14. The electric shaver as claimed in claim 13, wherein the lighting module has a cavity which is covered by an optically transmissive upper wall of the lighting module that comprises the light output surface, wherein the PCB is arranged in said cavity, and wherein the potting material extends between the main surface of the PCB and the upper wall of the lighting module.

15. The electric shaver as claimed in claim 1, wherein the electric shaver comprises a shaver main body coupled to the shaving unit and comprising an electric motor for driving the one or more hair-cutting units of the shaving unit;

wherein the one or more hair-cutting units of the shaving unit each comprise an external cutting member with a plurality of hair-entry openings and an internal cutting member with a plurality of cutting elements covered by the external cutting member and movable relative to the external cutting member, and wherein the controller is accommodated in the shaver main body.

* * * * *